United States Patent

Okamoto

[11] Patent Number: 5,949,816
[45] Date of Patent: *Sep. 7, 1999

[54] SPREAD SPECTRUM COMMUNICATION APPARATUS

[75] Inventor: Naoki Okamoto, Chiba, Japan

[73] Assignee: Sharp Kabushiki Kaisha, Osaka, Japan

[*] Notice: This patent is subject to a terminal disclaimer.

[21] Appl. No.: 08/812,135

[22] Filed: Mar. 5, 1997

[30] Foreign Application Priority Data

Mar. 5, 1996 [JP] Japan .................................... 8-47118
Jan. 23, 1997 [JP] Japan .................................... 9-10135

[51] Int. Cl.$^6$ .............................. H04B 15/00; H04K 1/00; H04L 27/30
[52] U.S. Cl. .............................................. 375/208; 375/222
[58] Field of Search .................................... 375/200, 208, 375/259, 316, 343, 347, 222; 370/334, 491; 455/101

[56] References Cited

U.S. PATENT DOCUMENTS

| | | | |
|---|---|---|---|
| 5,425,059 | 6/1995 | Tsujimoto | 375/347 |
| 5,646,958 | 7/1997 | Tsujimoto | 375/233 |
| 5,809,019 | 9/1998 | Ichihara et al. | 370/334 |
| 5,812,593 | 9/1998 | Kaku | 375/208 |
| 5,832,021 | 11/1988 | Kondo | 375/200 |

FOREIGN PATENT DOCUMENTS

| | | |
|---|---|---|
| 3-150938 | 6/1991 | Japan . |
| 4-360434 | 12/1992 | Japan . |
| 5-183534 | 7/1993 | Japan . |
| 5-252141 | 9/1993 | Japan . |

OTHER PUBLICATIONS

Spread Spectrum Communication System, by Mitsuo Yokoyama, pp. 529–530.

*Primary Examiner*—Chi H. Pham
*Assistant Examiner*—Bryan Webster
*Attorney, Agent, or Firm*—Birch, Stewart, Kolasch & Birch, LLP

[57] ABSTRACT

Correlation between a received signal and a PN code is obtained by a correlating portion. A correlation timing signal is detected by a correlation timing detecting portion, a delay profile is calculated by a delay profile calculating portion with reference to the correlation timing signal and a signal from a known data portion detecting portion. The delay profile is applied to a demodulating portion, and setting of path diversity is determined based on the delay profile.

5 Claims, 22 Drawing Sheets

SPREAD SPECTRUM COMMUNICATION APPARATUS

CROSS REFERENCE TO RELATED APPLICATION

The present application is related to U.S. patent application Ser. No. 08/689,412 filed on Aug. 7, 1996 and the present application includes, in addition to the embodiments of the prior application, embodiments for selecting number of multiplexing and amount of delay.

BACKGROUND OF THE INVENTION

1. Field of the Invention

The present invention relates to a spread spectrum communication apparatus. More specifically, the present invention relates to a spread spectrum communication apparatus for transmission/reception using direct sequence spread spectrum communication with a data format having known data portion in a preamble portion.

2. Description of the Background Art

Communication using a narrow band modulation system has been conventionally used in the field of data communication. Such a system is advantageous in that demodulation at the receiver can be carried out by a relatively small circuitry. However, it is not suitable for an environment where there are much reflection and multipath fading, such as in a room. By contrast, in a spread spectrum communication system, spectrum of data is spread by a spread code and the data is transmitted in a wide band. Therefore, the aforementioned disadvantage can be eliminated.

FIG. 24 is a block diagram showing a general structure of such a spread spectrum communication system. FIG. 24 is a block diagram showing a demodulation system, which includes a PDI (post detection integrator).

Referring to FIG. 24, a signal input from an input terminal is input to correlating portion 1. Correlating portion 1 provides correlation of the input signal, and the correlated output is applied to a differentiating portion 2 delayed by 1 symbol of data by delay portion 5, and it is differentially demodulated. An output from differentiating portion 2 is input to a PDI portion 3. Meanwhile, in a correlation timing detecting portion 6, a correlation timing is determined, and PDI operation is performed at the correlation timing and data is determined.

Here, PDI refers to a method of integrating demodulated signals for a period of time spread of multiplexed communication. RAKE method is also known as a similar method in which multipath signals are demodulated by respective addition using a transversal filter and a weighting circuit.

FIG. 25 shows correlated output waveforms in the system shown in FIG. 24. In a general radio wave propagating environment, there are a number of delay waves which are considered to be subjected to Rayleigh fading. In this case, if there is not a delay, the correlated waveform has peaks only when correlation is established as shown in FIG. 25(a). However, if there are a number of delay waves, the delay waves have peaks of correlated waveforms respectively, and the resulting waveform, which is a linear sum of these, is as shown in (b) of FIG. 25. Such spread caused by delay indicates the state of delay. Therefore, this is called a delay profile.

PDI is capable of demodulation from these number of delay waves and improving performance. For example, when there is not a delay wave, demodulation at the timing A shown in FIG. 25(a) is most efficient. However, when there are a number of delay waves, the spread of delay wave reaches the timing t1 of (b) of FIG. 25. Therefore, up to that time, the signal component is included. Therefore, integration of results of demodulation improves performance. However, if in this case, integration is continued up to timing t2, there is not a signal component later than the time t1, and therefore integration merely increases noise, degrading performance. If integration is performed up to the time t3, the time period for integration is too short to ensure sufficient performance. Practically, highest performance can be obtained by determining a delay wave period having a certain level or higher. The trade off is determined based on the ratio of signal component and noise component increased when the time period for integration is increased.

For example, when the time period for integration is doubled, the noise component would also be doubled. By contrast, the signal component would be the result of integration of components obtained from the delay profile of correlated waveform shown in FIG. 25(b). Optimal time period for integration can be determined based on the ratio therebetween. However, in general communication environment, the delay profile changes with time. Therefore, conventionally, the time period for integration is determined to be optimal based on numerous past rate data, and it is incorporated in hardware when implementing the system.

FIG. 26 shows effects provided by the conventional PDI. Referring to FIG. 26, when PDI or RAKE method is employed, performance can be improved than when not (under Rayleigh fading condition). Here, when path diversity such as PDI or RAKE is used, the performance depends on how much delay wave the communication environment employed bears, and on how much the delay waves are collected (integration or addition). Generally, as described in the foregoing, the period of integration is determined based on the past experimental data. However, the environment used changes with time generally, and hence the spread of delay wave changes from time to time. Therefore, it is impossible to always maintain an optimal period of integration. Therefore, compared with theoretical optimal value, the performance in an actual system is inferior.

FIG. 27 shows correlated output waveforms in the conventional system. Conventionally, depending on the environment used, there is much amount of delay, and sometimes data component of previous signal may overlap the succeeding signal, as shown in (b) of FIG. 27, resulting in degraded performance. In view of the foregoing, when designing a communication system, it is necessary to determine a data symbol speed so as not to overlap the adjacent signals and to ensure sufficiently large time interval between symbols with respect to the delay amount. These are also determined based on the past experimental data, as above. However, as already mentioned, the amount of delay is not constant. Therefore, sometimes a signal of the previous symbol may overlap the following signal, causing degraded performance as shown in (b) of FIG. 27.

FIG. 28 is a schematic block diagram showing a transmitter of a spread spectrum communication system in which a spread code is delayed and multiplexed in the method of high speed transmission using spread spectrum, proposed by the inventor of the present application in Japanese Patent Application No. 7-206159. Referring to FIG. 28, the transmitter of the spread spectrum communication system includes a data generating portion 11, an S/P converting portion 12, multipliers 13, 14, 15 and 16, modulators 17, 18, 19 and 20, a PN generator 21, a local signal generator 22, delay elements 23, 24, 25 and 26, a multiplexer 27, a frequency converting portion 28, a power amplifying portion 29 and a transmission antenna 30.

Data generating portion 11 generates differentially coded data, and each data is converted to a plurality of parallel data by S/P converting portion 12. PN generator 21 generates a spread code. Multipliers 13 to 16 multiply the plurality of parallel signals from S/P converting portion 12 by the spread code from PN generator 21, and generates and applies spread signals to modulators 17 to 20.

Modulators 17 to 20 modulate the spread signals by using a local frequency signal from local signal generator 22, and provides intermediate frequency signals. Delay elements 23 to 26 delay the intermediate frequency signals and apply these signals to multiplexer 27. Multiplexer 27 multiplexes the delayed signals, converts the frequencies by frequency converting portion 28, and the frequency converted signal is amplified by power amplifying portion 29 and output as a transmission signal from transmission antenna 30.

FIG. 29 shows correlated outputs when the signal transmitted from the transmitter shown in FIG. 29 is received and passed through a correlator. As compared with the example shown in FIG. 25, in the example shown in FIG. 29, the time between each of the data is shorter, and the multiplexed delay has arbitrary value dependent on the amount of delay. Therefore, the possibility of overlap of multipath delay waves is higher, dependent on the environment of propagation. In order to avoid such a problem, the number of multiplexing/amount of delay must be varied. The reference for determining these values may be initialized uniquely in accordance with the place of installation and varied in accordance with the error rate. However, this method is not very precise, still resulting in some degradation in performance. Further, if margin is too large and the number of multiplexing is too small, data rate will be decreased and system through put is degraded.

SUMMARY OF THE INVENTION

Therefore, an object of the present invention is to provide a spread spectrum communication system in which setting of path diversity is optimally determined as needed, in allowing improvement in performance such as error rate.

Briefly stated, the present invention provides a radio wave communication apparatus for transmission/reception using direct sequence spread spectrum communication with a data format having a known data portion in a preamble portion characterized in that a received signal is correlated with a predetermined code in a correlating portion, the known data portion is detected by a detecting circuit from the correlated signal, a correlation signal at time of actual measurement of the known data portion is output from a delay profile calculating portion based on the detection signal of the known data portion, the output signal and the correlated output of the known data portion are compared, and a delay profile, which indicates the state of delay signal, is output.

Therefore, according to the present invention, the correlated output of known data portion which is stored in advance or calculated, is compared with the detected correlated output, and the delay profile is calculated based on the result of comparison. Therefore, influence of autocorrelation can be eliminated and only the delay portion can be calculated precisely.

In a preferred embodiment of the present invention, delay spread is found from the calculated delay profile, and various delay properties are calculated based on predetermined theoretical formulas based on the value, whereby delicate control becomes possible and hence change in propagation path at very high speed can be addressed.

In a preferred embodiment of the present invention, an integrating circuit is provided which integrates two signals compared with each other, at every timing of same spread period, and provides the output therefrom as a delay profile. Therefore, influence of gaussian noise can be reduced and delay profile can be output precisely.

In a preferred embodiment of the present invention, difference signal between two signals compared with each other is filtered at every timing of same spread period, and the output therefrom is used as a delay profile. Therefore, influence of delay signal portion such as gaussian noise can be more successfully reduced as compared with simple integration.

Further, in the preferred embodiment of the present invention, the number of multiplexing and the amount of delay are determined based on detected error rate, detected carrier to noise ratio, or amount of information of input data to be transmitted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
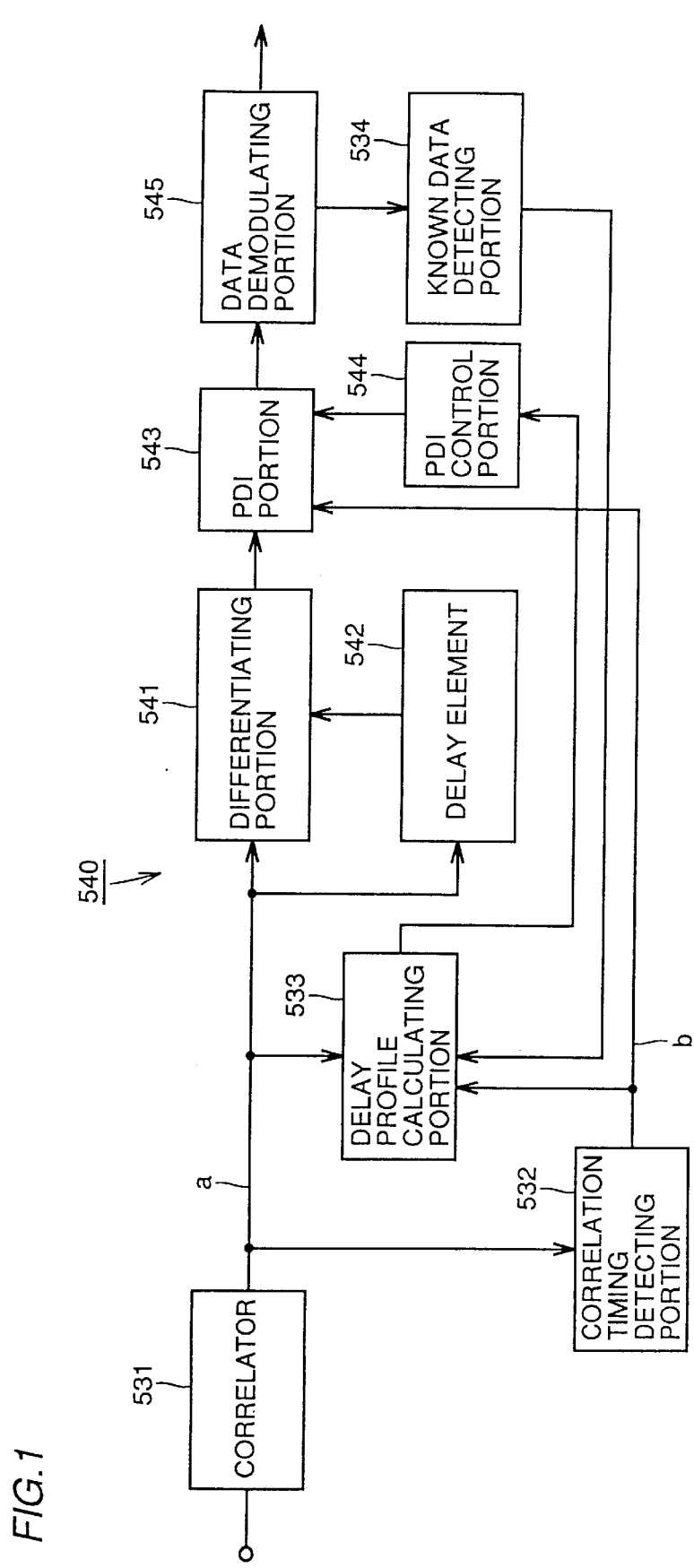
FIG. 1 is a block diagram showing a first embodiment of the present invention.

FIG. 1 is a schematic block diagram showing the first embodiment of the present invention. The signal input from an input portion is correlated with the PN code at correlating portion 531, and output as a correlated signal. The correlated signal is applied to correlation timing detecting portion 532, and correlation timing detecting portion 532 generates a correlation timing signal for demodulation and applies it to delay profile calculating portion 533. Delay profile calculating portion 533 calculates the condition of the delay signal (profile), using the correlation timing signal and a signal from a known data detecting portion 534, which will be described later, as references. The correlated signal from correlating portion 531 is also applied to demodulating portion 540.

Demodulating portion 540 includes differentiating portion 541, delay portion 542, PDI portion 543, PDI control portion 544 and data demodulating portion 545. The correlation timing signal is applied to PDI portion 543, and the delay profile calculating signal from delay profile calculating portion 533 is applied to PDI control portion 544. PDI control portion 544 receives the signal from delay profile calculating potion 533 and controls the time of integration of the PDI order to optimize control of the PDI portion 543.

Figure 2:
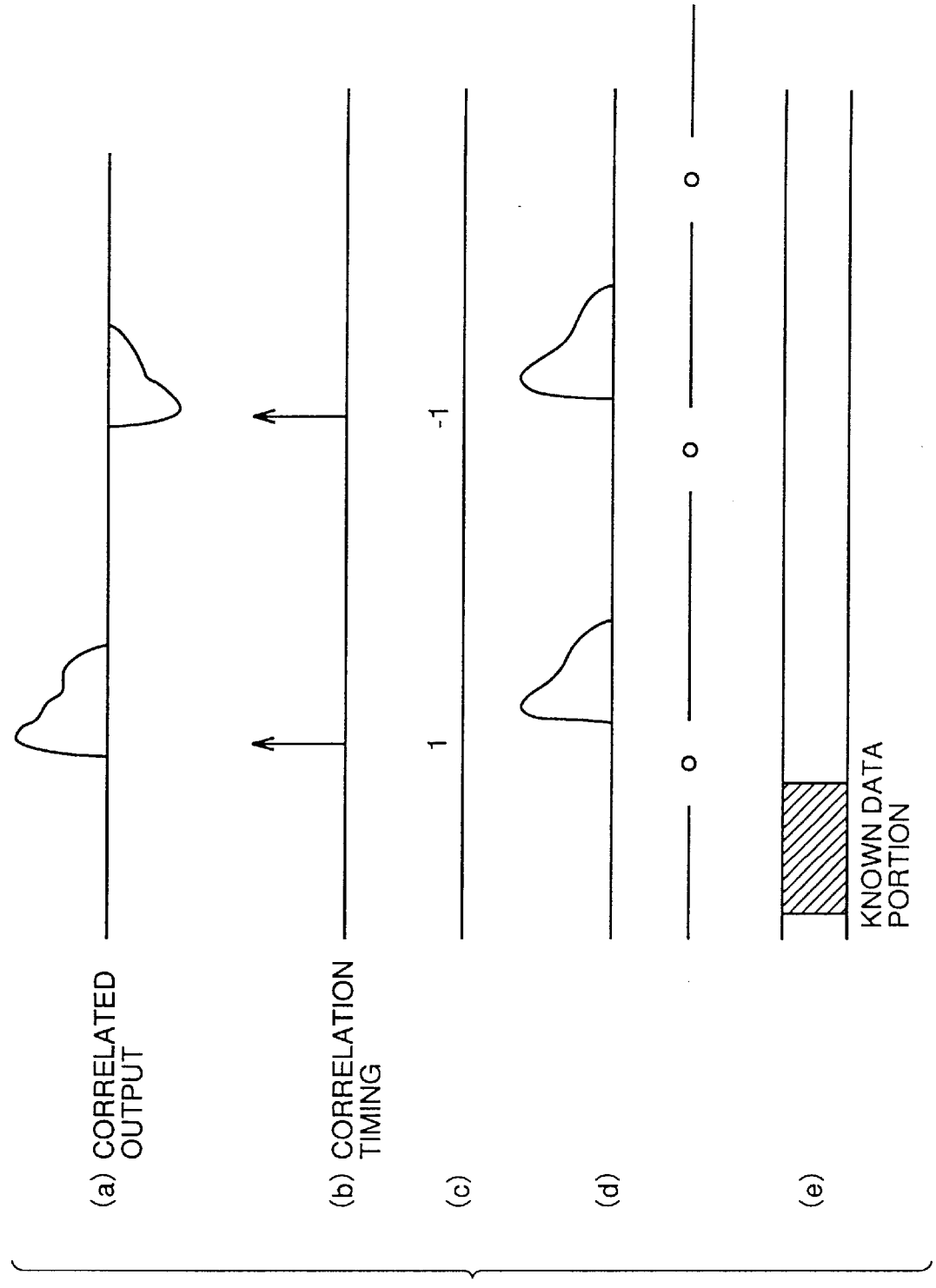
FIG. 2 is a timing chart showing the operation of the first embodiment of FIG. 1.

FIG. 2 is a timing chart showing the operation of the first embodiment of the present invention. The operation of FIG. 1 will be described with reference to FIG. 2. The correlated output from correlator 531 is as shown in (a) of FIG. 2, which is the delay profile to be applied to delay profile calculating portion 533. However, in this state, whether the data is positive or negative is not known. Therefore, the resulting delay profile has positive and negative portions. Delay profile calculating portion 533 determines timing of the correlated output based on the correlation timing signal such as shown in FIG. 2(b) applied from correlation timing detecting portion 532, and with this timing and the signal from the known data detecting portion 534, it determines whether the data is 1 or −1 as shown in (c) of FIG. 2. Then, delay profile not having the distinction of positive/negative such as shown (d) of FIG. 2 is calculated. This can be realized only when whether the data is positive or negative is known.

In the above described first embodiment, it becomes possible to calculate the delay profile, as known data detecting portion 534 is provided. Specific example will be described in detail in the following. Of the data, known data portion is as shown in FIG. 2(e). The portion (e) of FIG. 2 has time span on the abscissa different from that of portions (a) to (d) of FIG. 2.

In general communication,. data is often in the form of packet or in a frame configuration. Therefore, there is known data portion such as a preamble portion in each frame. In this case, known data detecting portion 534 detects the signal at the known data portion, in accordance with the signal demodulated at data demodulating portion 545. At this time, assume that the length of the known data portion is 100 bits. If the operation of the correlation timing detecting portion 532 and demodulating portion 540 attains the steady state in the first portion, for example, of ten and several bits of the known data portion, then the next coming signals in the remaining several tens of bits are all known on the receiving side. As a result, it becomes possible to transmit the values of data to be received next, to the delay profile calculating portion 533.

Figure 3:
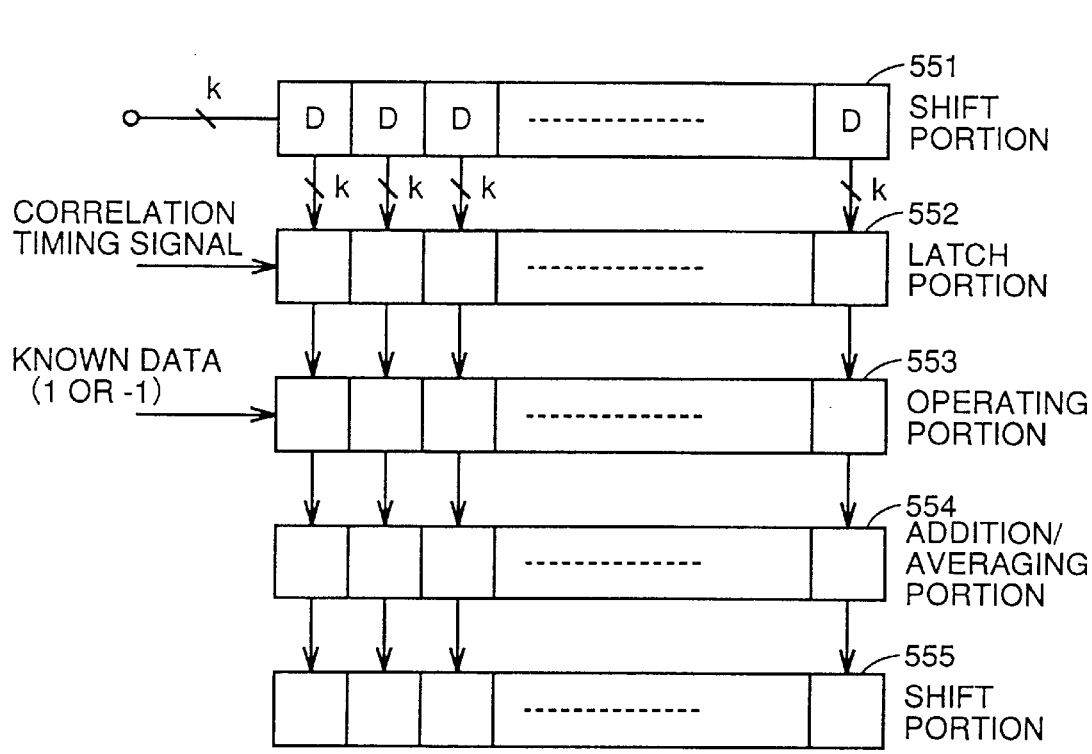
FIG. 3 is a schematic block diagram of the delay profile calculating portion shown in FIG. 1.

FIG. 3 is a block diagram showing an example of delay profile calculating portion 533 shown in FIG. 1. FIG. 3 shows an example in which correlating operation is performed in digital manner. The correlated output signal from correlating portion 531 shown in FIG. 1 is applied to shift portion 551 and shifted sample by sample. The output is latched by latch portion 552 in accordance with the correlation timing signal. Thereafter, the known data for determining whether the correlated output is positive or negative mentioned above is received from known data detecting portion 534, and data without the distinction of positive/negative is calculated at the operating portion 553. This results in the delay profile without negative/positive distinction described with reference to FIG. 2(d). In general communication path, there is signal components other than delay because of noise or the like. Therefore, to reduce such components, addition and averaging are performed at adding and averaging portion 554. Though noises are not related sample by sample, the delay profile is correlated. Therefore, influence of noise or the like can be reduced by addition and averaging. Delay profile is transmitted thereafter by shift portion 555.

Figure 4:
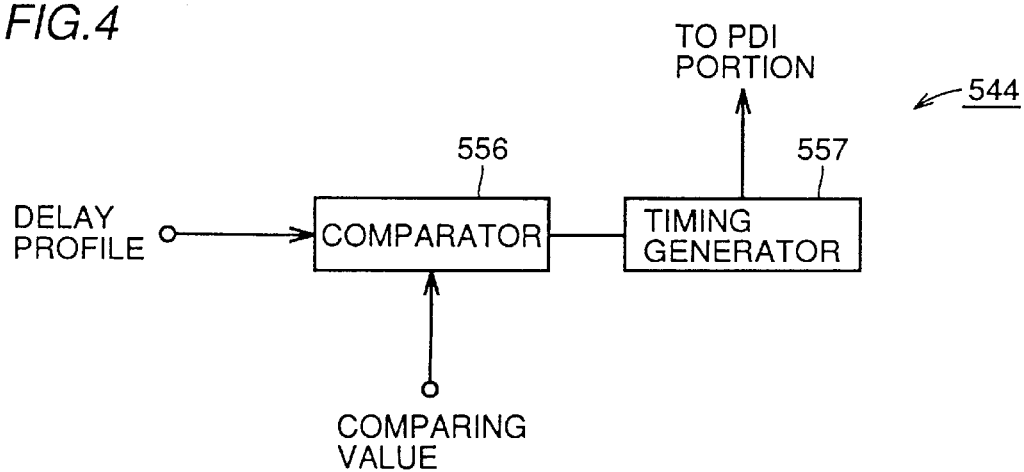
FIG. 4 is a specific block diagram of known data detecting portion shown in FIG. 1.

FIG. 4 is a block diagram showing an example of PDI control portion 544 shown in FIG. 1. Referring to FIG. 4, the input delay profile is compared with a comparison reference value at comparator 556. If it is larger than the comparison reference value, it is determined to be a valid region of the delay profile. If the comparison reference value is made larger, only the signals of high level will be added. If the value is made lower, most of the delay signals will be added. The comparison reference value is set in accordance with the condition based on experiments, past data and so on. It may be determined uniquely in accordance with the location of the communication system, or it may be changed by the control of higher layer such as computer application actually utilizing the communication.

In this manner, timing generator 557 transmits the timing signal of the period for integration to PDI portion 543 so that the period for integration determined to be valid is used for PDI. At this time, the signal which exceeded the comparison reference value may be used as it is, or it may be transmitted after it is held, or precision may be improved by repeating integration several times.

As described above, in the first embodiment of the present invention, as known data detecting portion 534 is provided, delay profile without positive/negative distinction can be calculated based on the known data portion, which known data portion is detected by the known data detecting portion 534 without the necessity of demodulating data of the demodulation timings, whereby path diversity such as PDI can be performed in the optimal period of integration at that time period. As compared with the conventional example in which PDI is performed with the period of integration fixed, in the present embodiment, optimal delay profile at that time point can be used for demodulation, and hence error rate can be improved. Generally, the time of one frame is several milliseconds. Therefore, it is considered that there is hardly a fluctuation in propagation path in the same frame. Therefore, almost optimal control becomes possible by this embodiment.

In the above described embodiment, differential demodulation and PDI has been described. However, the present invention is also applicable to other modulation methods and provides similar effects. Further, it is generally applicable to the method using path diversity in which performance depends on the delay profile. For example, it is applicable to the method such as RAKE. Though delay profile calculating portion 533 and PDI control portion 544 are used in the example of FIG. 1, means for calculating delay profile and control means other than these may be used.

Figure 5:
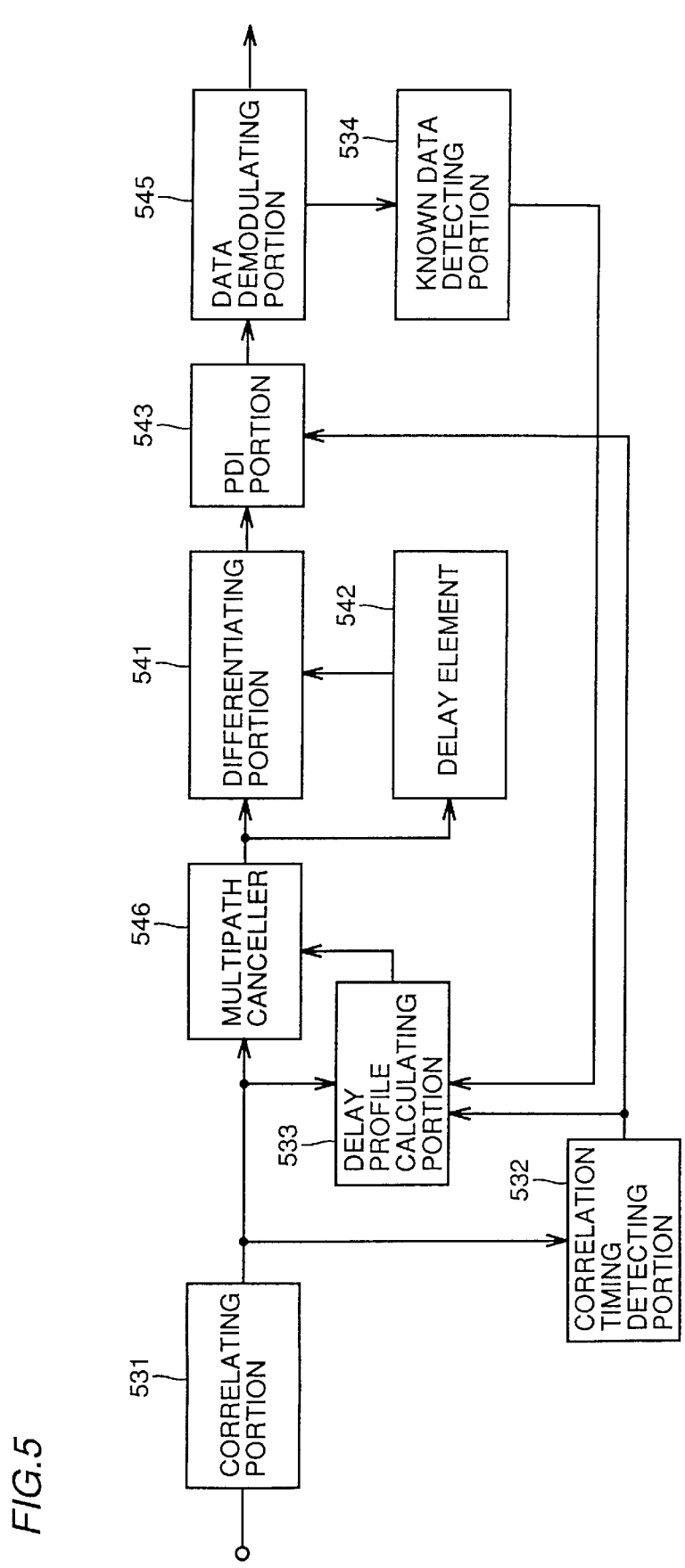
FIG. 5 is a block diagram showing a second embodiment of the present invention.

FIG. 5 shows the second embodiment of the present invention. In the example shown in FIG. 5, PDI control portion 544 of FIG. 1 is omitted, and a multipath canceler 546 is newly provided between correlating portion 531 and differentiating portion 541. Multipath canceler 546 removes multipath component from correlated output signal, and inputs the correlated output signal with the multipath component removed to the differentiating portion 541 of demodulating portion 540.

Figure 6:
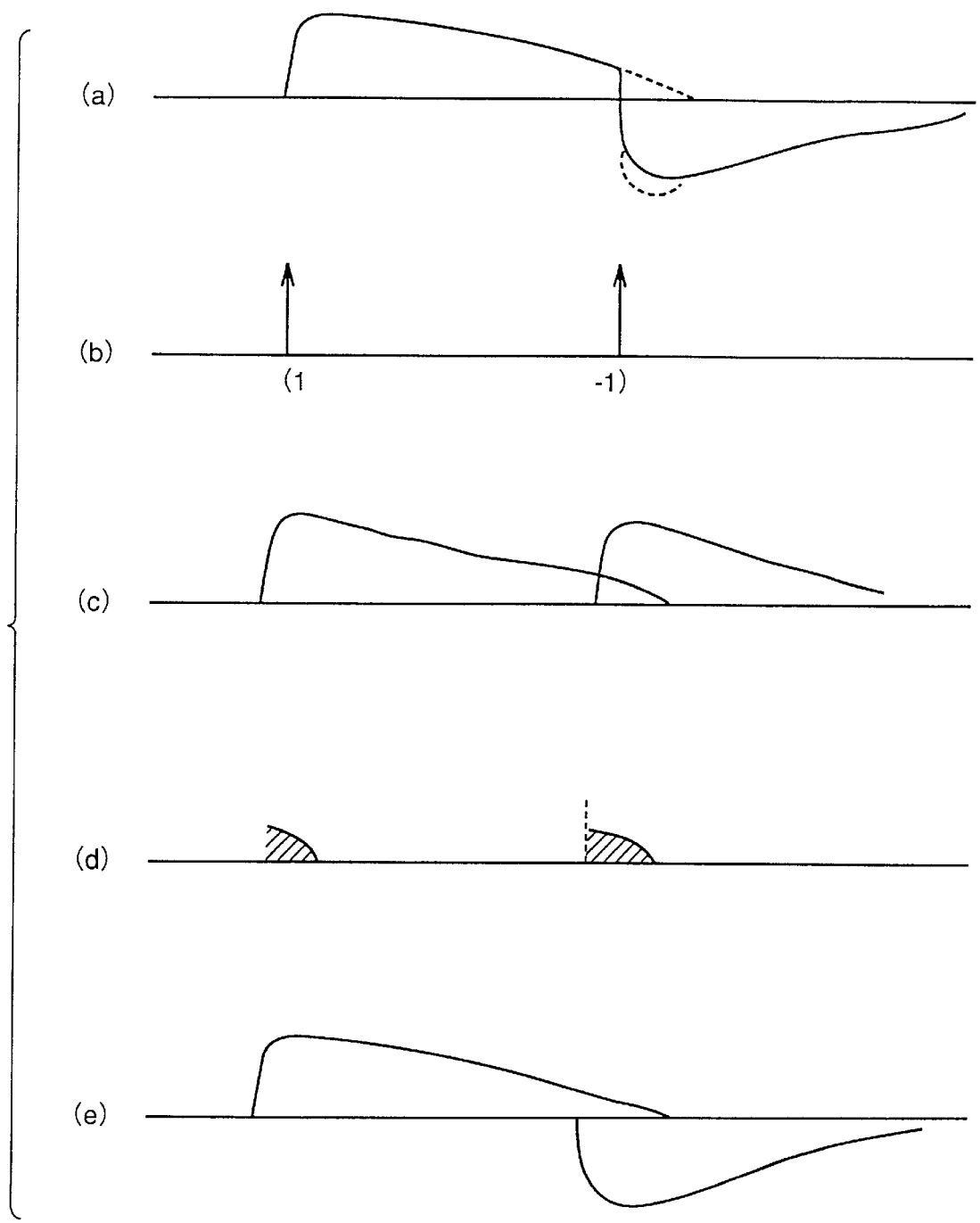
FIG. 6 is a timing chart showing the operation of the embodiment shown in FIG. 5.

FIG. 6 is a timing chart showing the operation of the embodiment shown in FIG. 5. The operation will be described with reference to FIG. 6. The correlated output is as shown in (a) of FIG. 6. The correlated output is as shown in FIG. 6(a), in which the solid line represents the actual signal, while the dotted lines correspond to the overlapping portions of the data signals. As can be seen, the correlated output is a superposition. In this case, different from the first embodiment, the preceding data signal is overlapped with the following signal, resulting in degraded performance. Therefore, in the second embodiment, the delay component is subtracted by using the correlated output before data demodulation, to improve performance. First, multipath canceler 546 knows the timing of the correlated output as shown in (b) of FIG. 6 from the correlation timing signal. Meanwhile, in the similar manner as the first embodiment, delay profile calculating portion 533 calculates the delay profile as shown in (c) of FIG. 6, thereby calculating the signals where overlapping should be avoided, as shown in (d) of FIG. 6. By using this information, the component corresponding to the delay profile is cancelled in accordance with the value of the preceding demodulated data. As a result, the correlated signal comes to have the inherent signal component of itself as shown in (e) of FIG. 6, whereby degradation caused by the delay component of the preceding signal can be avoided.

Conventionally, in order to avoid such overlapping, the data rate has been determined based on delay profiles of large amount of data obtained experimentally. However, since the condition for use changes frequently, sometimes overlapping occurs inevitably, causing degradation of performance, or the data rate is made lower than necessary taking too large a margin, resulting in inefficiency of communication. However, the second embodiment of the present invention enables highly efficient communication without error.

Performance can further be improved when the second embodiment is combined with the first embodiment.

Figure 7:
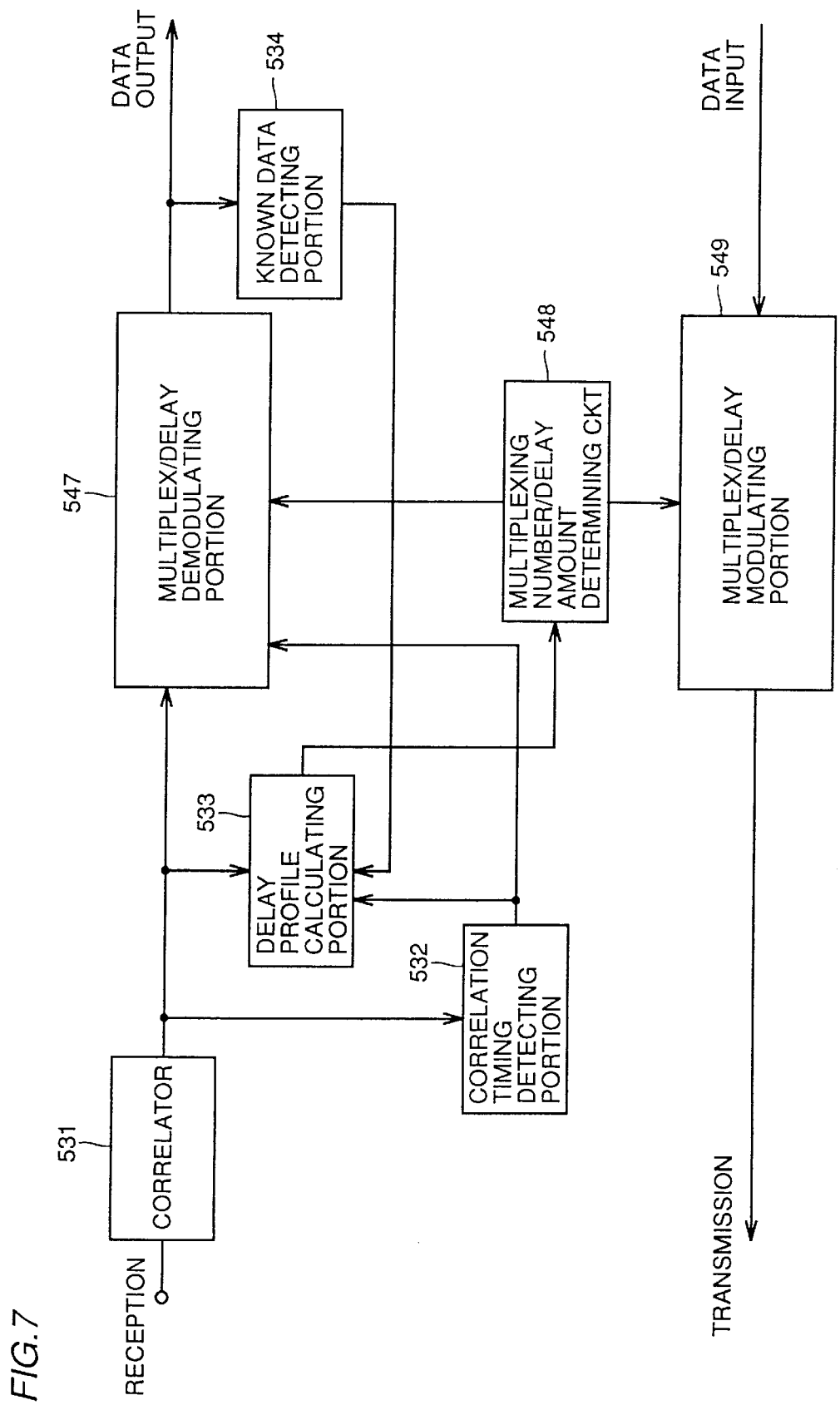
FIG. 7 is a block diagram showing a third embodiment of the present invention.

FIG. 7 is a block diagram showing the third embodiment of the present invention. In this embodiment, demodulating portions 547 and multiplexing number/delay amount determining portion 548 are provided in place of the data demodulating portion 540 shown in FIG. 1. The delay profile signal calculated in delay profile calculating portion 533 is applied to multiplexing number/delay amount determining circuit 548, and the number of multiplexing and the amount of delay are determined in accordance with the delay profile. The output from correlating portion 531 is applied to demodulating portion 547, and in accordance with the output from the multiplexing number/delay amount determining circuit 548, the number of multiplexing and the amount of delay are determined. In this case, since it is transmission/reception system for communication, modulating portion 549 is provided on the transmitting side, and the number of multiplexing and the amount of delay of the modulating portion 549 are determined in accordance with the output from the multiplexing number/delay amount determining circuit 548.

Figure 8:
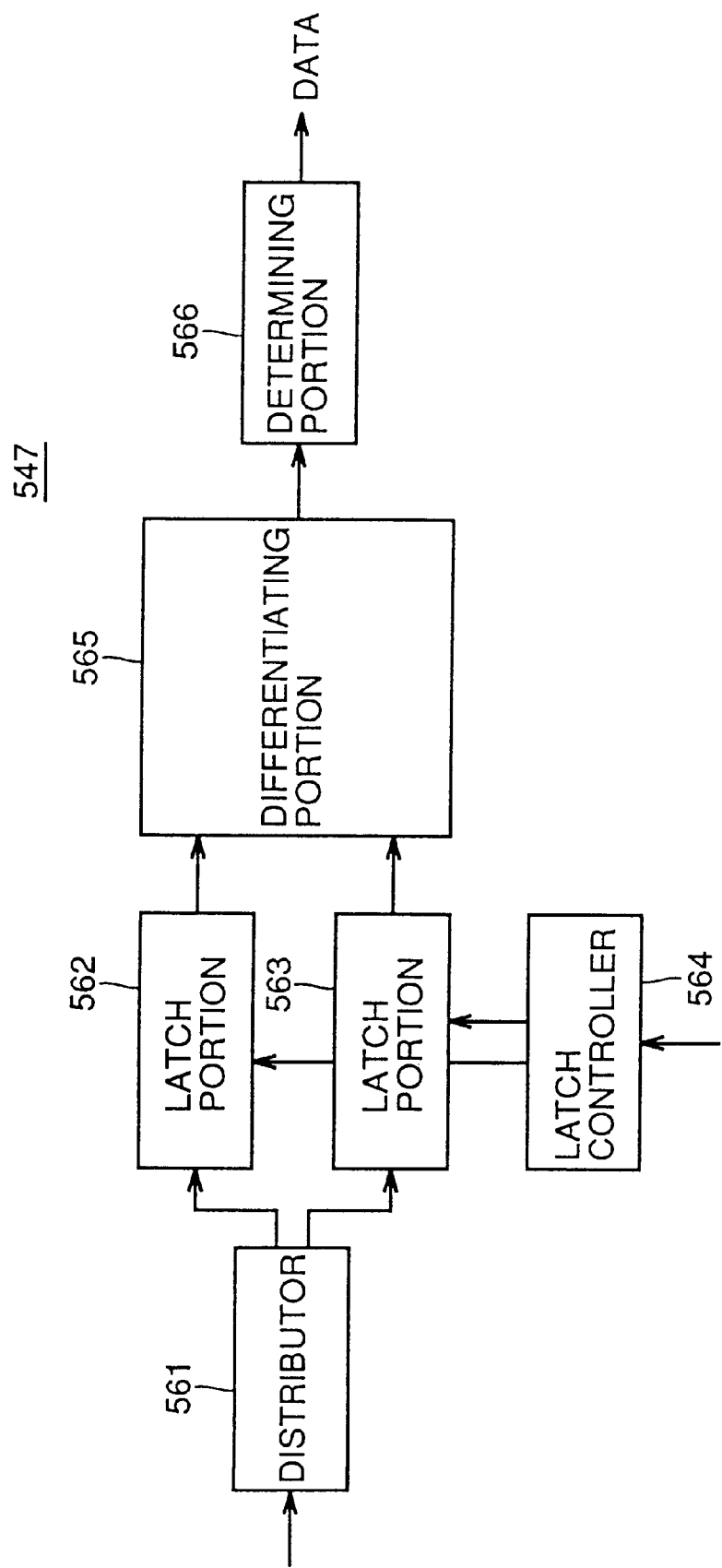
FIG. 8 shows a specific example of the demodulating portion of FIG. 7.

FIG. 8 is a block diagram showing the structure of the demodulating portion employing the multiplexing and delaying method shown in FIG. 7. Referring to FIG. 8, the demodulating portion 547 includes a distributor 561, latch portions 562, 563, a latch controller 564, a differentiating portion 565, and a determining portion 566. The correlated output from correlating portion 531 shown in FIG. 7 is applied to distributer 561, and the number of multiplexing and the amount of delay are applied from multiplexing number/delay amount determining circuit 548 to latch controller 564. Distributer 561 distributes the correlated signal from correlating portion 531 into two and generates distribution signals. One of the distribution signals from distributor 561 is applied to latch portion 562, and the other is applied to latch portion 563. Latch portion 562 latches one of the distribution signals from distributor 561 by the latch control signal from latch controller 564, and latch portion 563 latches the other one of the distribution signals from the distributor 561 by the latch control signal from latch controller 564.

More specifically, the correlated signal from correlator 531 includes four signals of different correlation multiplexed in time. Therefore, by latching at latch portions 562 and 563 at the delay timing of the multiplexed signals using the latch control signal from latch controller 564, a signal preceding by one delay time can be acquired. Based on the latched signals at latch portions 562 and 563, differential decoding is performed at differentiating portion 565, and demodulation is performed. The differentially decoded signals are output as data through determining portion 566.

Figure 9:
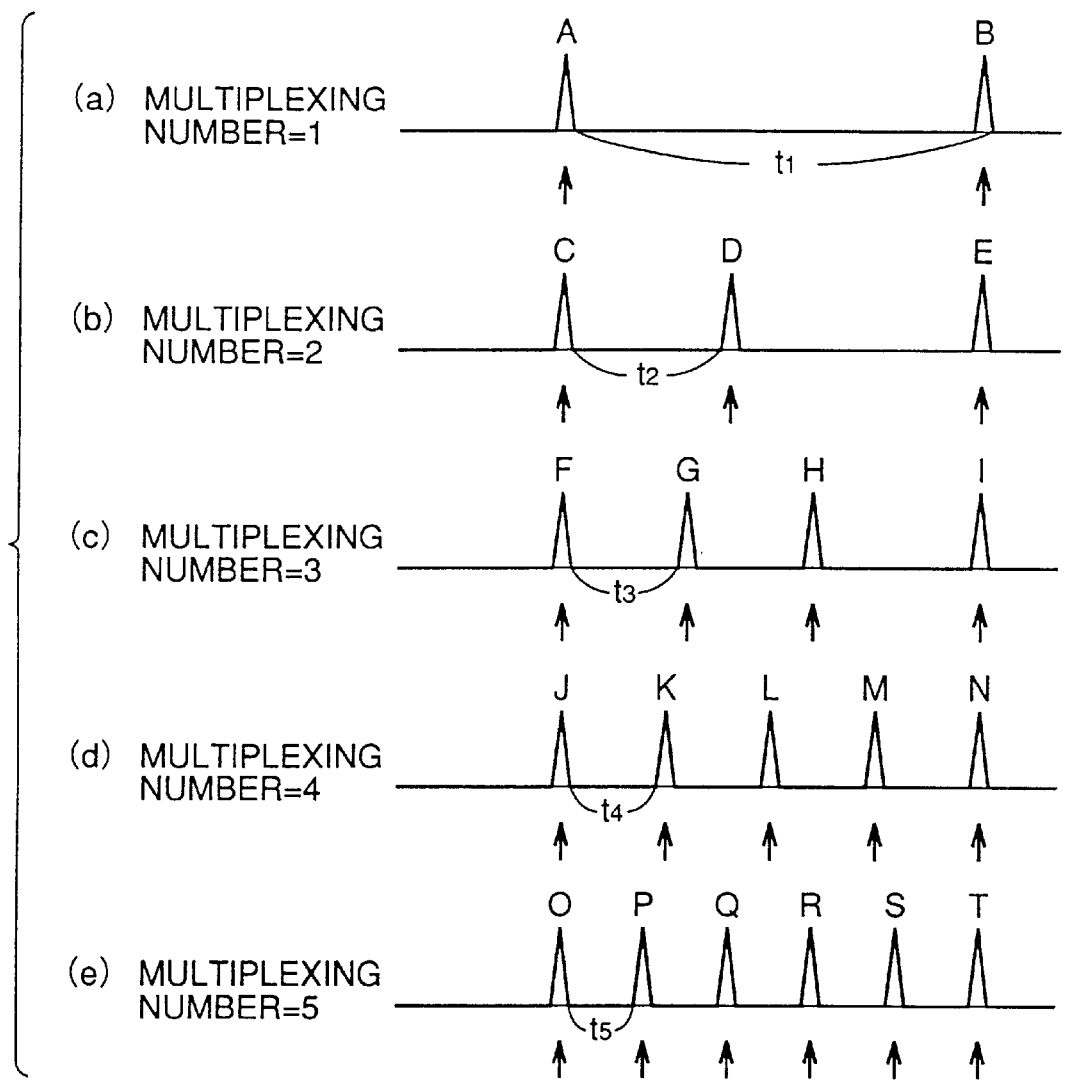
FIG. 9 is a timing chart showing the operation of FIG. 8.

FIG. 9 is a timing chart showing the operation of the modulating portion shown in FIG. 8. Let us consider the operation with the number of multiplexing varied from one to five. In latch portions 562 and 563, when the number of multiplexing is 1, the signals are latched at timings A and B shown in (a) of FIG. 9, and demodulation is performed at differentiating portion 565 based on the differentiated output. When the number of multiplexing is 2, the signals are latched at the timings C and D of (b) of FIG. 9 for differentiation, and differentiation between D and E is performed at the timing of D. As can be seen from FIG. 9, when the number of multiplexing is 1, the time difference between two correlated output is $t_1$, when the number is two, the time difference is $t_2$, when the number is 3, the time difference is $t_3$ as shown in (c), when the number is four, the time difference is $t_4$ as shown in (d), and when the number is five, the time difference is $t_5$ as shown in (e). Namely, time interval becomes shorter.

Therefore, if the calculated delay profile is large, the time difference t must be enlarged. For example, if the delay spread of the signal is $t_d$ from the delay profile, optimal transmission becomes possible when the relation $t_k<t_D<t_{k+1}$ is satisfied. In this manner, multiplication number/delay amount determining circuit determines the number of multiplexing and the amount of delay.

In the conventional method of delay and multiplexing, setting of the number of multiplication and the amount of delay are determined uniquely by preliminary set location or determined indirectly from the error rate. However, according to the third embodiment, it becomes possible to set optimal number of multiplexing and amount of delay. Therefore, degradation of performance caused by too much multiplexing or degradation in throughput caused by too small a number of multiplication with too large margin can be prevented.

Figure 10:
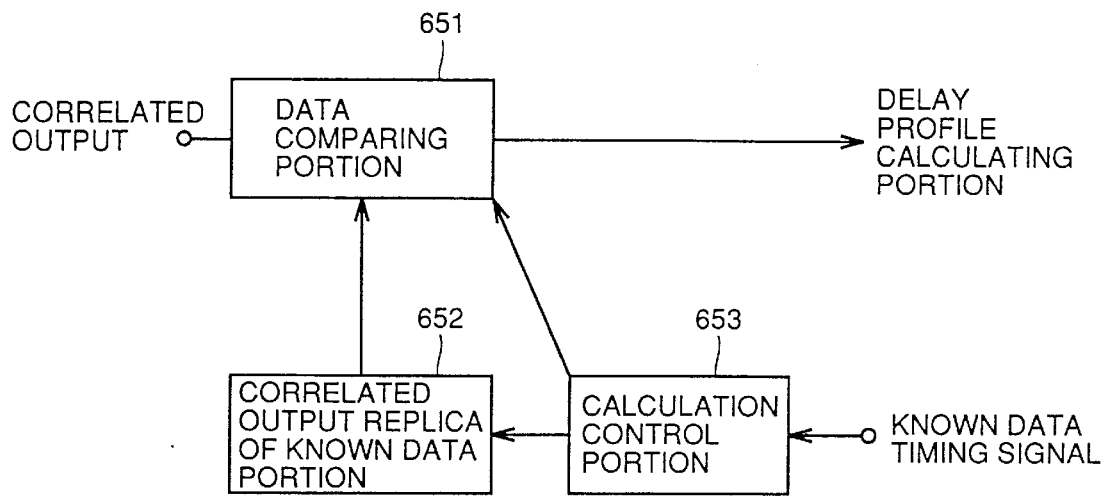
FIG. 10 is a block diagram showing a fourth embodiment of the present invention.

FIG. 10 is a block diagram showing the fourth embodiment of the present invention. In the embodiment shown in FIG. 1, the delay profile was calculated by adding known signal (1 or −1) to the measured data by delay profile calculating portion 533. In the fourth embodiment, precision of the result of calculation is enhanced.

More specifically, the correlated output signal output from the correlating portion 531 shown in FIG. 1 is applied to data comparing portion 651. Meanwhile, storing portion 652 stores values of EVEN and ODD auto-correlation in advance in the form of replica. Further, known data timing signal output from known data detecting portion 534 shown in FIG. 1 is applied to calculation control portion 653, and calculation control portion 653 applies the known data timing signal to data comparing portion 651 and storing portion or memory portion 652. Storing portion 652 applies, based on the known data timing signal, the correlated output replica of the known data portion to data comparing portion 651. Based on the known data timing signal, data comparing portion 651 compares the correlated output with the correlated output replica of the known data portion applied from storing portion 652, outputs a delay profile and applies it to delay profile calculating portion 533 shown in FIG. 1.

Figure 11:
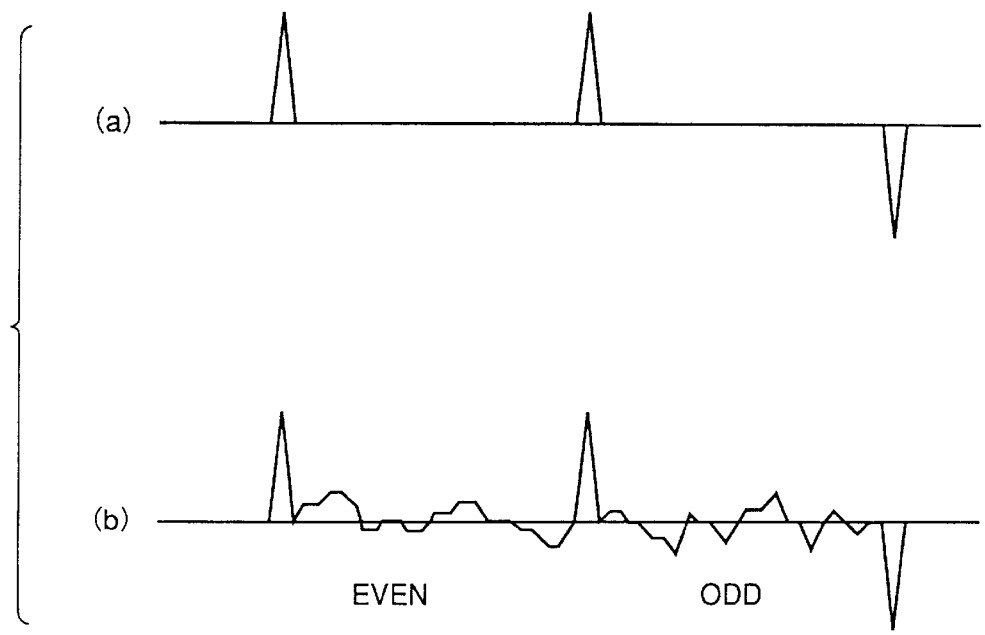
FIG. 11 is a timing chart showing the operation of the embodiment shown in FIG. 8.

FIG. 11 shows the operation of the embodiment shown in FIG. 10. The operation of the embodiment shown in FIG. 10 will be described with reference to FIG. 11. An ideal spread code attains the maximum output when the correlation matches, as shown in FIG. 11(a), and in other periods, it assumes 0. However, actual spread code is not ideal. Therefore, though it attains the maximum output when correlation matches, it assumes several values because of auto-correlation of every signal in other periods. These values differ dependent on whether the data is (1, 1), (1, −1), (−1, 1) or (−1, −1), which are referred to as EVEN (continuation of the same data) and ODD (continuation of different data), as shown in FIG. 11(b). The auto-correlation value is uniquely determined by the spread code. Therefore, only the inherent delay component can be calculated if the data is stored in advance in the form of replica.

In the method of calculating the delay profile described above, the delay profile is obtained such as shown in FIG. 2(d). However, in this method of calculating the delay profile, the values of EVEN and ODD auto-correlations are not considered. Therefore, the resulting delay profile still contains this component. If we represent the inherent delay profile by f(t) and the output component of auto-correlation taking into account the delay by g(t), what is obtained by the method of calculating the delay profile described above is f(t)+g(t).

Therefore, in the present embodiment, the EVEN and ODD auto-correlation values are stored in advance in storing portion 652 in the form of replica to calculate the g(t) component, whereby only the inherent delay profile f(t) can be obtained by subtracting g(t) from f(t)+g(t). In this manner, in the present embodiment, delay profile free of degradation caused by auto-correlation can be obtained, and hence system performance can be improved.

Figure 12:
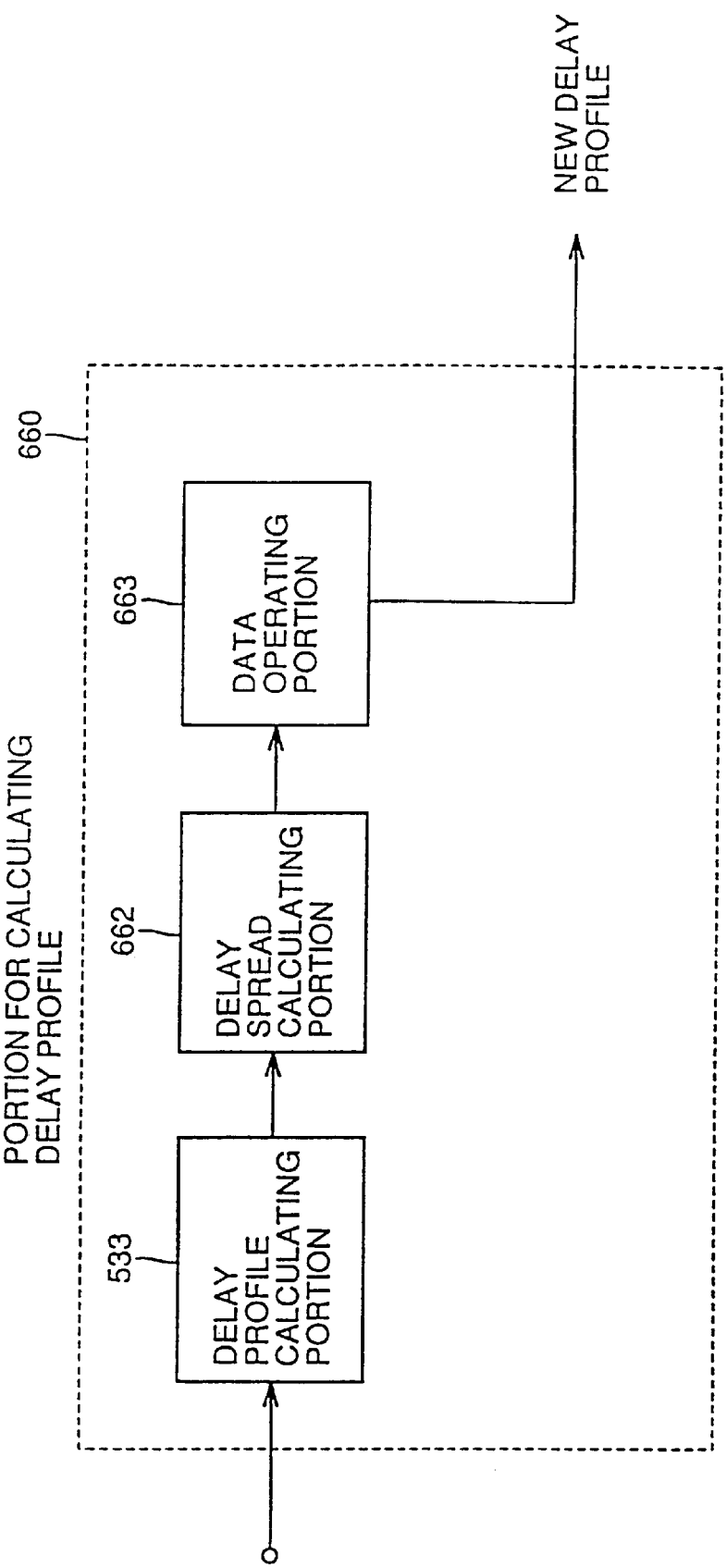
FIG. 12 is a block diagrams showing a fifth embodiment of the present invention.

FIG. 12 is a block diagram showing the fifth embodiment of the present invention. The delay profile calculating portion 660 shown in FIG. 12 calculates and uses a new delay profile from the calculated delay profile, and it includes delay profile calculating portion 533, delay spread calculating portion 662 and data calculating portion 663.

Figure 13:
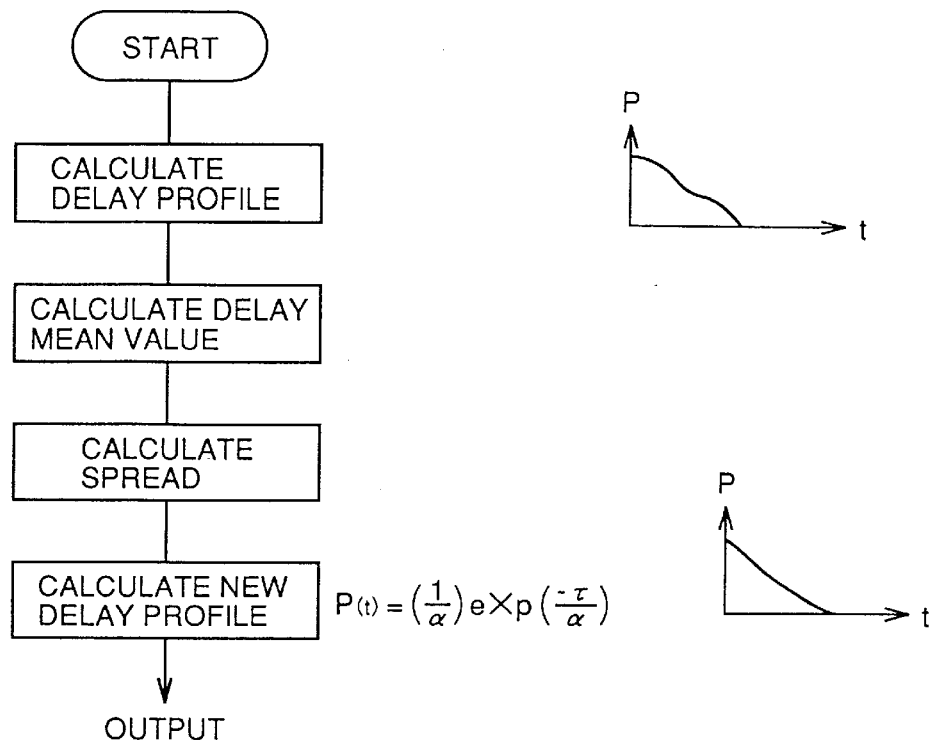
FIG. 13 is a flow chart showing the operation of the fifth embodiment of the present invention.

FIG. 13 is a flow chart showing the operation of delay profile calculating portion 530 shown in FIG. 12. Referring to FIGS. 12 and 13, delay profile calculating portion 533 calculates the delay profile, delay spread calculating portion 662 finds mean value of the delay time, and calculates spread based on the actually measured value and mean value. This is the same as general calculation of spread. Data calculating portion 663 calculates a new delay profile using the result. The new delay profile is an exponential curve such as shown in FIG. 13, which is different from the actually measured value to a certain extent. However, sometimes it is preferable to use this profile, when the actual value fluctuates, for example.

The new delay profile may be calculated by providing a memory table consisting of an ROM, for example, instead of data calculating portion 663. In that case, ROM implementation becomes more simple if exponential operations are done in advance and the results are stored in the form of a table. Alternatively, the delay time and a power (normalized value) at that time may be used as inputs to the ROM. In that case, though the number of tables is increased, operations of mean value and spreads can be omitted.

For calculating a new delay profile, equation such as follows may be used, where a represents delay spread.

$$P(\tau)=(1/\sigma) \exp(-\rho/\sigma)$$

In the first and third embodiments above, it is assumed that the delay profile does not change in one frame. However, it is possible that the delay profile changes in one frame in a special environment, for example when extremely high operation is being done or when there are a number of objects which operate at high speed. However, in that case also, the environment for use itself is not much changed. Accordingly, general delay spread is approximately constant, and the maximum delay spread is also approximately constant. From this point of view, sometimes it is preferable to use not the calculated data itself but the data re-calculated. The fifth embodiment realizes this option.

In the above described fourth embodiment, a method of calculating exact delay profile by using a replica has been described. In wireless communication link, there is the influence of not only delayed wave but also the influence of white noise when C/N is not satisfactory. Therefore, the signal derived from auto-correlation, correlated outputs derived from delay waves and correlated output derived from white noise are superposed in the correlated output. Though the auto-correlation component is removed in accordance with the fourth embodiment described above, white noise component is left, which affects calculation in delay profile.

Therefore, a sixth embodiment for reducing the influence of white noise will be described.

Figure 14:
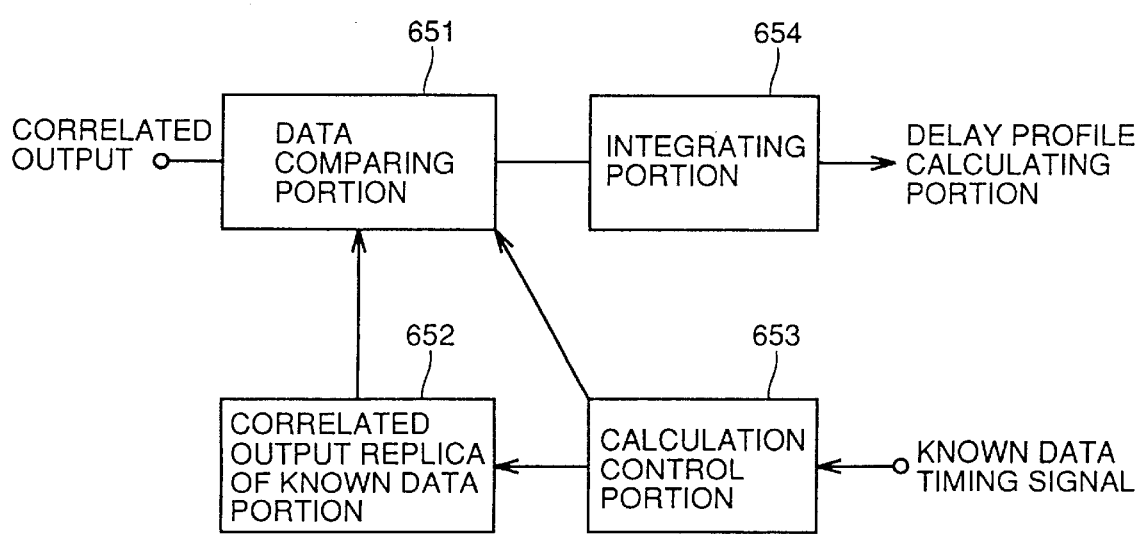
FIG. 14 is a block diagram showing a sixth embodiment of the present invention.

FIG. 14 is a block diagram showing the sixth embodiment. In the embodiment shown in FIG. 14, integrating portion 654 is provided at the output of data comparing portion 651 shown in FIG. 10. Integration by integrating portion 654 is performed at the same timing of each code, the delay profile is correlated at the same timing while the white noise has no correlation with respect to time. Therefore, by integration at integrating portion 654, the ratio of delay profile with respect to white noise becomes larger, and as a result, influence of white noise can be reduced.

Figure 15:
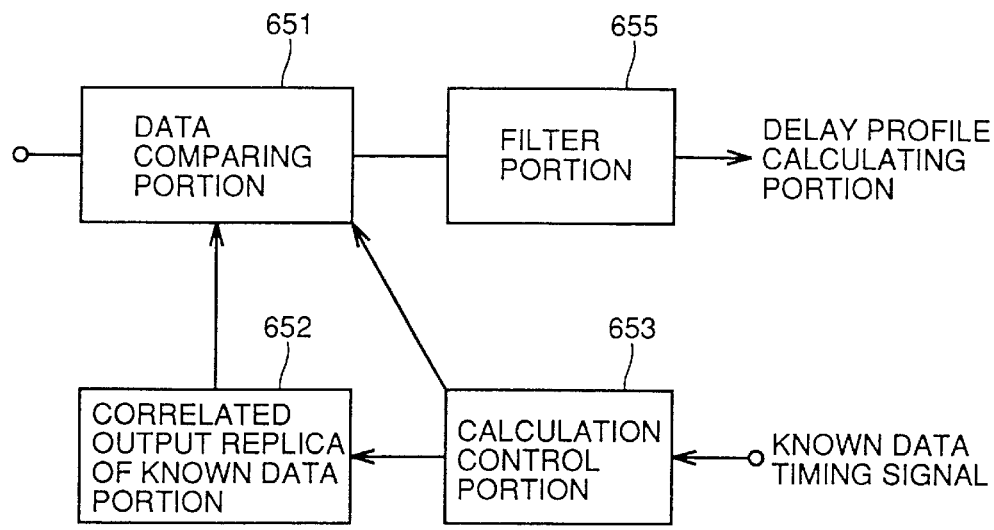
FIG. 15 is a block diagram showing a seventh embodiment of the present invention.

FIG. 15 is a schematic block diagram showing a seventh embodiment. In the embodiment shown in FIG. 14, integration is performed at the same timing by integrating portion 654 in order to reduce the influence of white noise. However, in the embodiment shown in FIG. 15, reduction of the influence is realized not by integration but by filter portion 655 for filtering at the same timing. Integrating operation is equivalent to the operation of a first order filter. However, by using second and third filters, for example, the performance can be enhanced as compared with integration which corresponds to the filtering operation of the first order, though the process becomes complicated.

Figure 16:
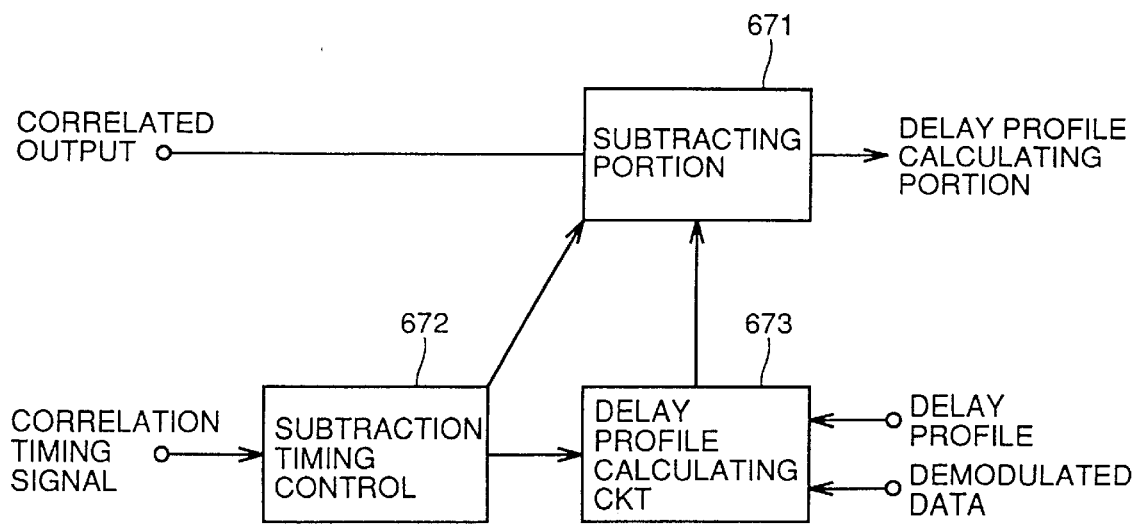
FIG. 16 is a block diagram showing an eighth embodiment of the present invention.

FIG. 16 is a block diagram showing an eighth embodiment in which a structure of a multipath canceler is shown. The delay profile and demodulated data are applied to delay profile calculating circuit 673. Delay profile calculating circuit 673 applies timing of the signal to be cancelled to subtracting portion 671, using correlation timing signal from the delay profile. From the delay profile and the data signal preceding the data to be demodulated, delay profile calculating circuit 673 calculates the delay profile which corresponds to an interference signal superposed on the data to be demodulated. Subtracting portion 671 subtracts only that signal which corresponds to the portion overlapping the next data from the correlated output and thereby cancels multipath, using a subtracting timing control signal based on the correlation timing signal output from subtraction timing control circuit 672.

In a conventional canceler, a method has been used in which a replica of a transmission signal is formed from a demodulated signal, and it is subtracted from the signal before correlation. The eighth embodiment can be implemented by a circuit which is more simple than the conventional method. This is because the delay profile is known in advance in accordance with the second embodiment, and hence maximum effect can be obtained by combining these embodiments.

Figure 17:
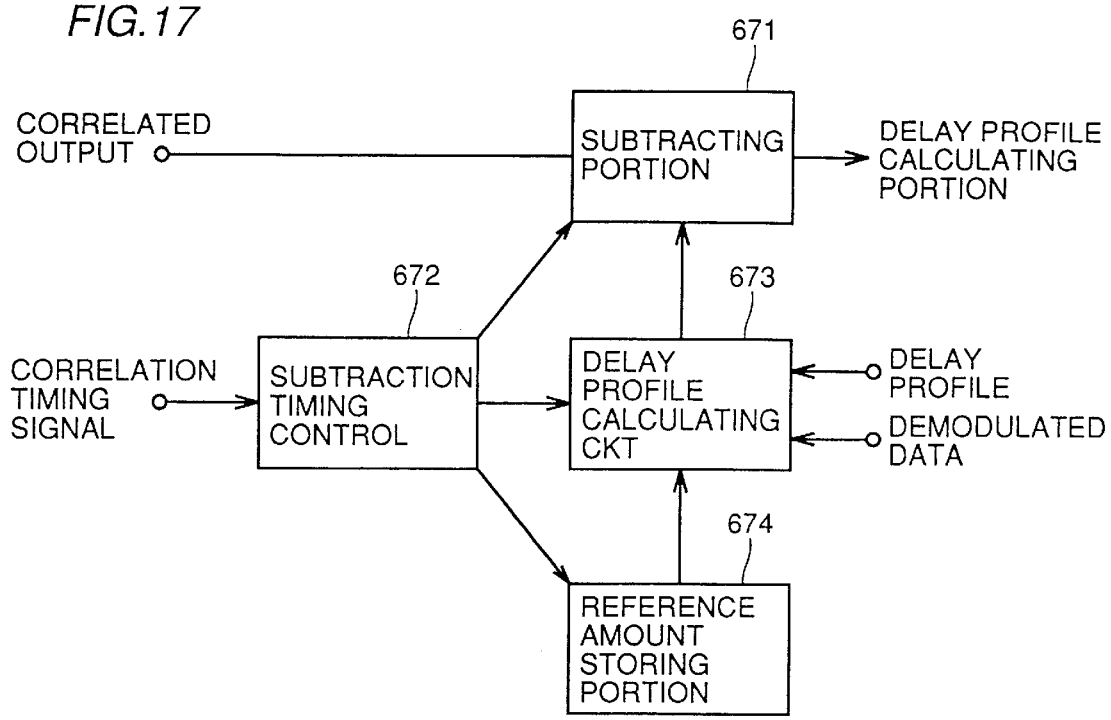
FIG. 17 is a block diagram showing a ninth embodiment of the present invention.

FIG. 17 is a block diagram showing a ninth embodiment of the present invention. In the eighth embodiment above, the multipath component of the portion overlapping the data is completely subtracted from the signal obtained by the delay profile. In the ninth embodiment shown in FIG. 17, reference amount storing portion 674 is provided, and a reference for determination of whether subtraction is to be carried out or not is stored in the reference amount storing portion 674. If this reference for determination is exceeded, the multipath component is subtracted. As the reference for canceling is provided in this manner, multipath signal which is small relative to the signal component is not subtracted. Though not subtracted, the multipath component which is small relative to the signal component does not much affect the demodulation characteristic. Therefore, there is an advantage that the power consumption is reduced and a circuit can be made compact by reducing processors of such small component.

Figure 18:
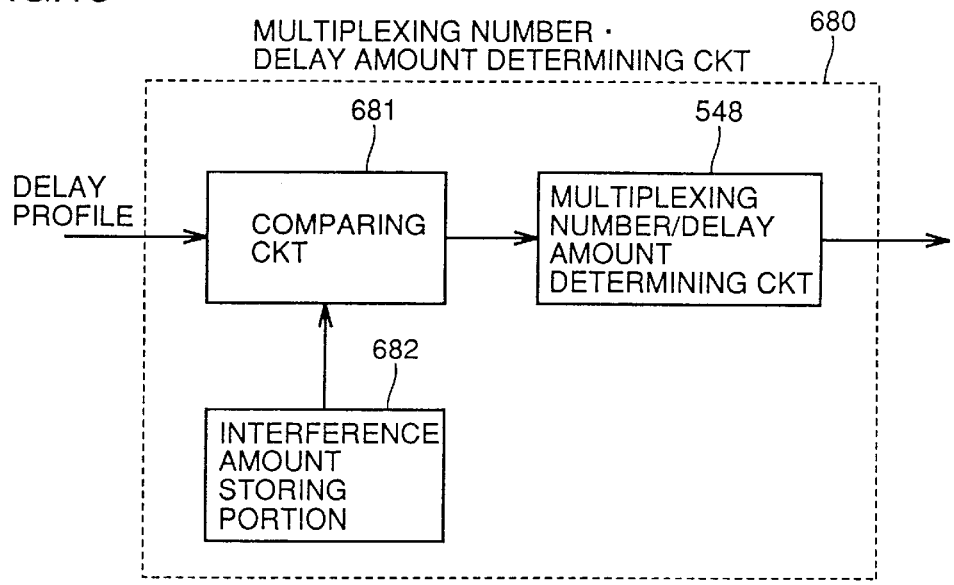
FIG. 18 is a block diagram showing a tenth embodiment of the present invention.

FIG. 18 is a block diagram showing a tenth embodiment of the present invention. In the embodiment shown in FIG. 9, the number of multiplexing and the amount of delay has been selected such that the delay wave caused by multipath does not overlap the next data in accordance with the delay profile. However, in actual communication, the necessary error rate differs dependent on the content of the data to be transmitted. For example, error rate of $BER=10^{-3}$ is necessary when voice is to be transmitted, and error rate of $BER=10^{-8}$ is necessary for transmitting data. In other words, there are various error rates suitable for respective contents. Sometimes higher data transmission rate is desired more than unnecessarily superior error rate.

Therefore, in the embodiment shown in FIG. 18, an amount of interference storing portion 682 stores in advance the relation between white noise and the amount of interference (C/I) corresponding to the error rate required of the communication link. A comparing circuit 681 compares the delay profile and the amount of interference stored in the amount of interference storing portion 682. Based on the comparison output, the number of multiplexing and the amount of delay are determined based on the necessary error rate and the amount of interference overlapped on the data portion when multiplexing.delay are performed, by multiplexing number.delay amount determining circuit 548.

For example, if C/I of at least 10 dB is necessary for voice transmission, corresponding amount of delay is calculated in accordance with the delay profile, and the number of multiplexing.delay amount are determined. If C/I of at least 15 dB is necessary for data, corresponding amount of delay is calculated in accordance with the delay profile, and the number of multiplexing.delay amount are determined. At this time, the number of multiplexing of the former example is larger naturally. In this manner, the number of multiplexing-delay amount optimal for the communication link can be determined in the present embodiment. Therefore, efficiency can be improved and throughput can be increased.

Figure 19:
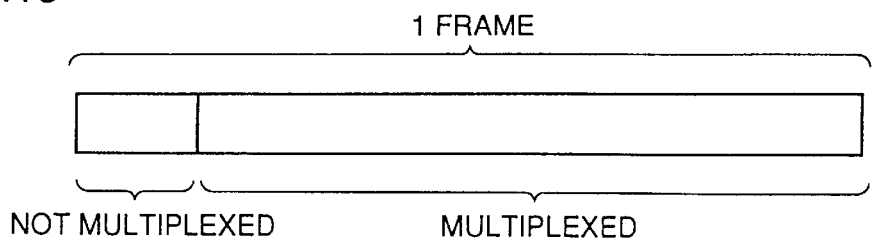
FIG. 19 shows a eleventh embodiment of the present invention.

FIG. 19 shows an eleventh embodiment of the present invention. In this embodiment, multiplexing is not performed at portions where information data is not included of the preamble portion in the data format, and only the portion containing information data are multiplexed. When the delay profile is to be calculated, it has been calculated based on the correlated output, or by using known data portion in the example of FIG. 12.

However, when multiplexing is performed, delay waves are overlapped because of multiplexing when delay profile is to be calculated. Therefore, the larger the number of multiplexing, the more complicated becomes calculation. Therefore, in the eleventh embodiment, a period which is not overlapped is used for calculating the delay profile, and actually necessary data portions are multiplexed. When not multiplexed, the time between the data becomes k times (k is the number of multiplexing) that of the time when multiplexed. Therefore, overlapping of several delays caused by multipath can be avoided. Therefore, delay profile can be easily calculated.

Though the number of multiplexing and amount of delay are determined from portions not multiplexed in the above embodiment, the data of the number of multiplexing and the amount of data may be incorporated in this non-multiplexed portion as data. The number of multiplexing-amount of delay are determined based on the delay profile. By incorporating the data in said non-multiplexed portion as data, it becomes possible that the receiving side receives the non-multiplexed portion to adjust the number of multiplexing and the amount of delay on the receiver side based on the result. In such a case, the number of multiplexing can be determined by the received result at that time without the necessity of determining the number of multiplexing both on the transmitting and receiving sides. Therefore, even if the number of multiplexing is varied as the data amount increases, demodulation can be performed without any problem. As a result, in accordance with variation in that propagation path, the number of multiplexing.amount of delay can be determined on real time basis, and the throughput can be improved.

In the system for communication with the number of multiplexing.amount of delay varied, the circuitry such as described above is necessary to determine settings. In bidirectional communication, such circuitry may be provided only on one side, and as a result, the circuit can be simplified. For example, if communication is carried out between a main station and a sub station, for example, means for detecting the number of multiplexing.delay amount should be provided only on the main station. Generally, several sub stations are connected to one main station. Therefore, the circuitry as a whole system can be significantly reduced.

In the above described embodiments, the number of multiplexing and the amount of delay have been so determined that signals do not overlap by delay, using delay profile. However, in the actual system, in order to detect the amount of delay, a circuit for that purpose is necessary.

Meanwhile, in the system to which the present invention is applied, the data is digital, and therefore when there is an error in transmission, the system may suffer a problem. Therefore, commonly, an error detection circuit or an error correction circuit is added so as to detect if there is any error. In the following embodiment, the number of multiplexing and the amount of delay are selected using signals which have been demodulated and subjected to error detection. More specifically, if the error rate is satisfactory, the number of multiplexing is increased, while if the error rate is not satisfactory, the number of multiplexing is reduced.

Figure 20:
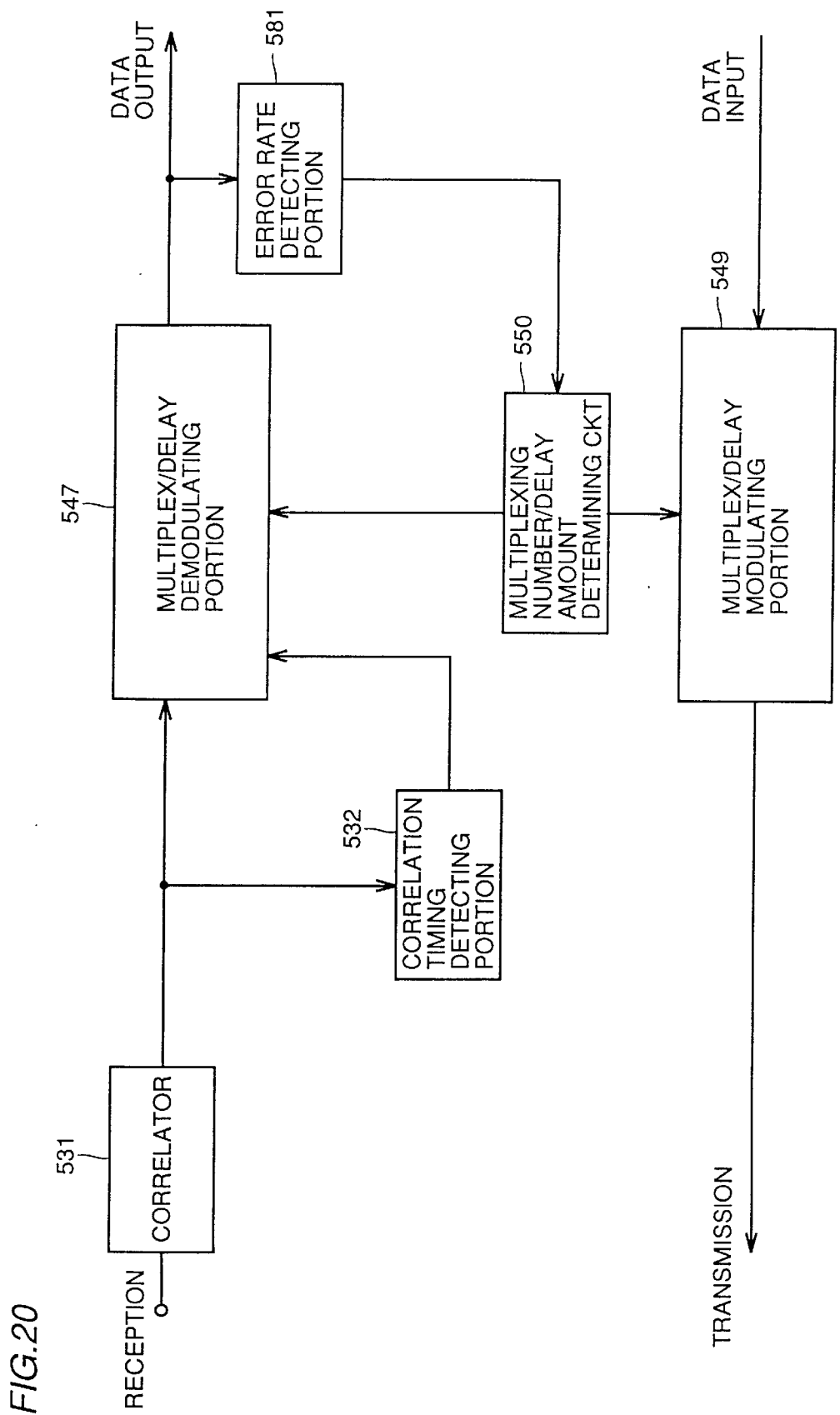
FIG. 20 shows a twelfth embodiment of the present invention.

FIG. 20 is a block diagram showing such a structure. In FIG. 20, in order to calculate error rate or to detect any error from signals demodulated at demodulating portion 547, an error rate detecting portion 581 is provided, and based on the output from error rate detecting portion 581, the number of multiplexing and the amount of delay are determined by the circuit for determining number of multiplexing/amount of delay.

When the error rate is poor, there are possibly two main causes. One is that there is signal overlap caused by delay. The other is poor C/N (carrier to noise ratio). At this time, there will be a margin for the delay profile when the number of multiplexing is reduced, and error rate per 1 bit of data can be improved when the number of multiplexing is reduced. This is because the number of bits for transmission is reduced with respect to the entire transmission power. As a result, error rate can be improved.

As described above, in the present embodiment, delay spread is not calculated but the number of multiplexing is switched dependent on the error rate. Therefore, the circuit can be simplified.

While error rate is used in the above described embodiment, in the following embodiment, C/N is detected and the number of multiplexing and the amount of delay are determined based on the result of detection.

Figure 21:
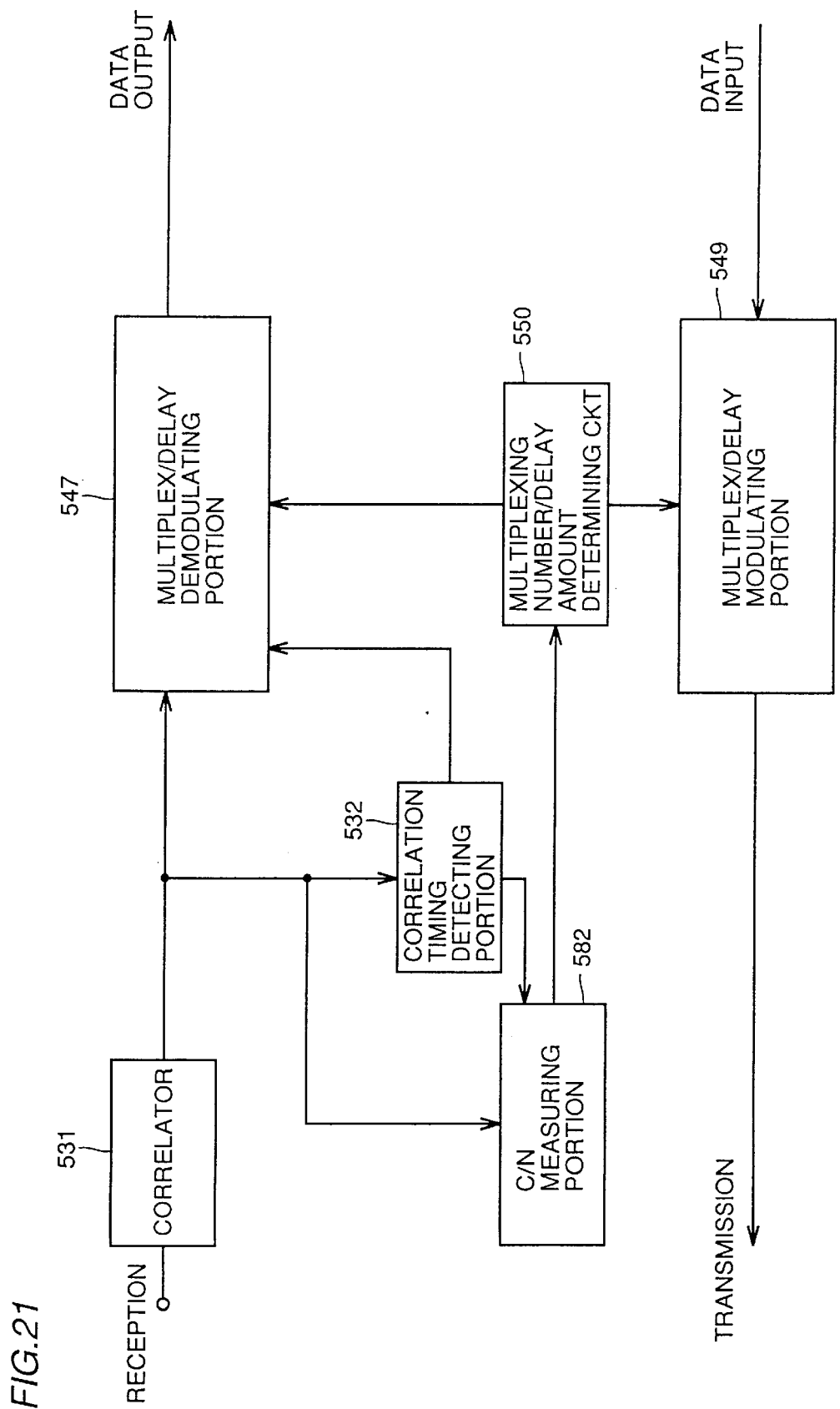
FIG. 21 shows a thirteenth embodiment of the present invention.

FIG. 21 is a block diagram showing such an embodiment. Referring to FIG. 21, a C/N measuring portion 582 for measuring C/N from an output from correlating portion 531 is provided, and the output from C/N measuring portion 582 is applied to the circuit for determining number of multiplexing/amount of delay 550. When spread spectrum is to be demodulated using correlating portion 531, C/N can be calculated, as one feature, from the ratio between received power and correlated spike, between correlated output signal and correlation spike at a correlation spike timing, and so on. According to this embodiment, the transmission power per 1 bit can be increased when the number of multiplexing is reduced. Therefore, when C/N is superior, transmission is performed with the number of multiplexing increased, while if C/N is inferior, transmission is performed with the number of multiplexing reduced. Accordingly, stable communication is possible no matter whether C/N is satisfactory or not.

Now, dependent on the type of information actually communicated, the amount of communication may not be constant. For example, the amount of transmission of image data is formidable, while the amount of information of audio data is relatively small. Therefore, in the next embodiment, the number of multiplexing and the amount of delay are changed in accordance with the amount of information of the data to be transmitted.

Figure 22:
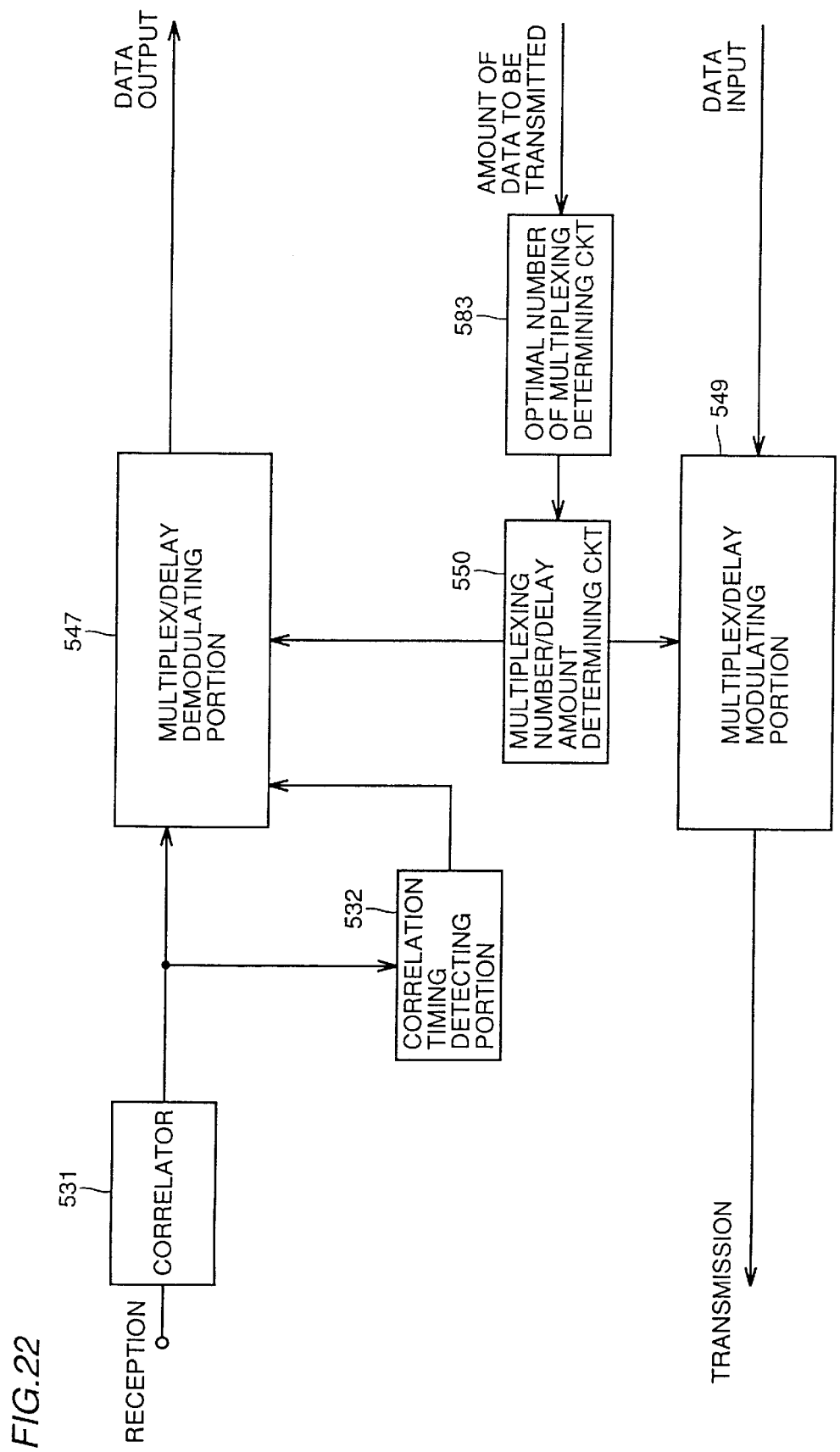
FIG. 22 shows a fourteenth embodiment of the present invention.

FIG. 22 is a block diagram showing such an embodiment. Referring to FIG. 22, the amount of data to be transmitted is applied to a circuit for determining optimal number of multiplexing 583, the circuit 583 for determining optimal number of multiplexing determines the number of multiplexing and the amount of delay based on the amount of data to be transmitted, and applies the determined values to circuit 550 for determining number of multiplexing/amount of delay. Therefore, in this embodiment, the number of multiplexing of portions to be multiplexed can be set at the non-multiplexing portion and data can be transmitted accordingly. Therefore, the number of multiplexing can be changed dependent on the amount of data to be transmitted. For example, a system with the number of multiplexing being 5 can transmit 2.5 times more information than the system of which number of multiplexing is 2, with the same circuit structure.

In this embodiment, the number of multiplexing is changed dependent on the amount of information. Therefore, assuming that the amount of transmission when the number of multiplexing is 1 is 1 Mbps, the amount of transmission when the number of multiplexing is 5 is 5 Mbps. The amount of transmission is controlled such that the number of multiplexing is the minimum number not smaller than the amount of transmission necessary, for example, if the amount of transmission is about 1.8 Mbps, the number of multiplexing would be 2, and if the amount of data is 3.5 Mbps, the number of multiplexing would be 4. In this case, the number of multiplexing and amount of delay are not changed in accordance with the delay profile, error rate or C/N as in the above described embodiments. However, if the system used for communication has sufficient margin in view of circuit design, the number of multiplexing and the amount of delay may be varied not in view of error rate but from the standpoint of amount of transmission required of the application. In this manner, transmission rate in accordance with the requirement of application can be set.

In the foregoing, control is performed in the system. However, for data transmission, not only hardware but also software dominant control may be performed. In such a case, the transmission protocol is constituted by several layers, and the physical amounts of the present invention are controlled by an upper layer.

Figure 23:
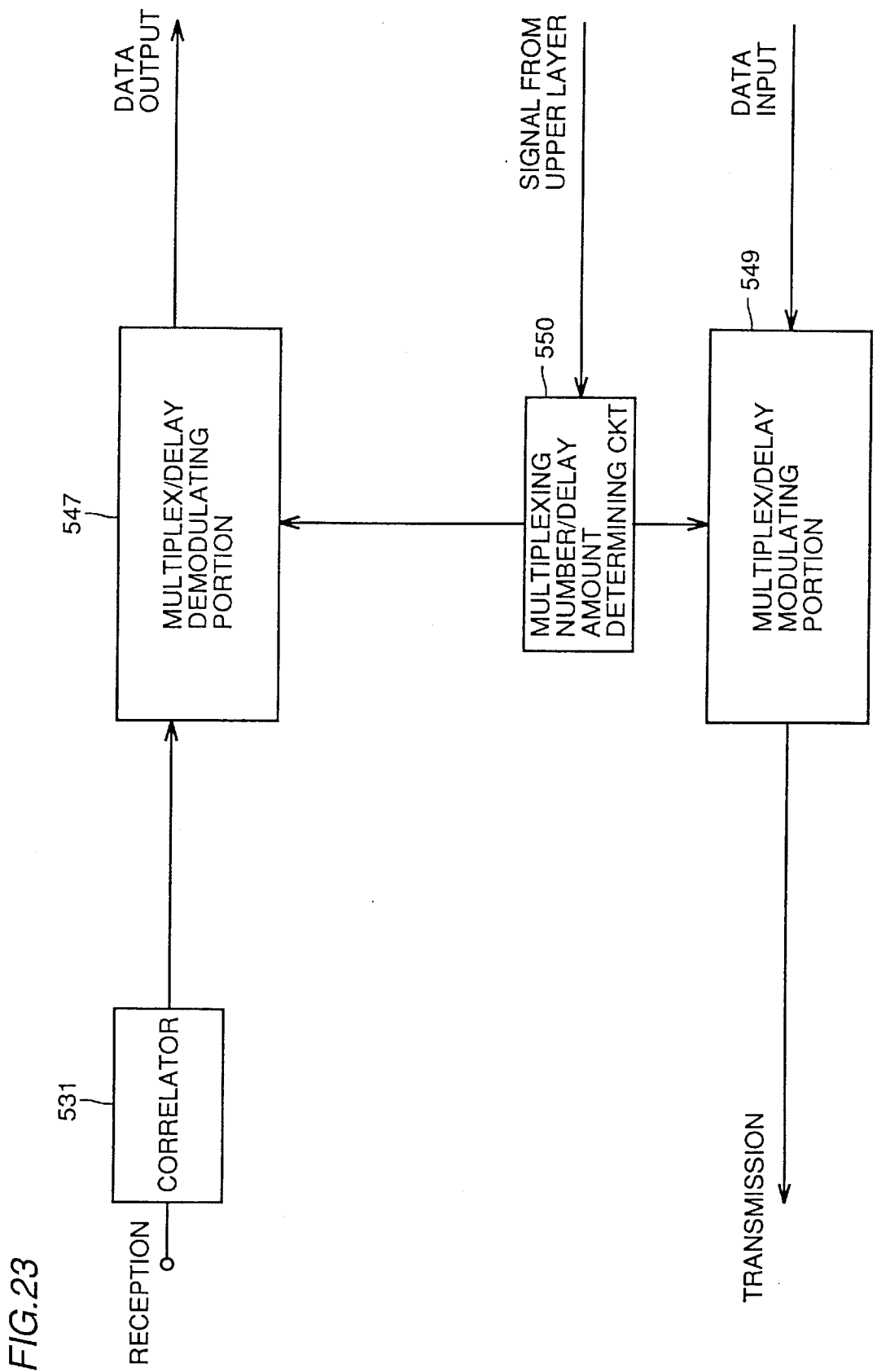
FIG. 23 is a block diagram showing a fifteenth embodiment of the present invention.
Figure 24:
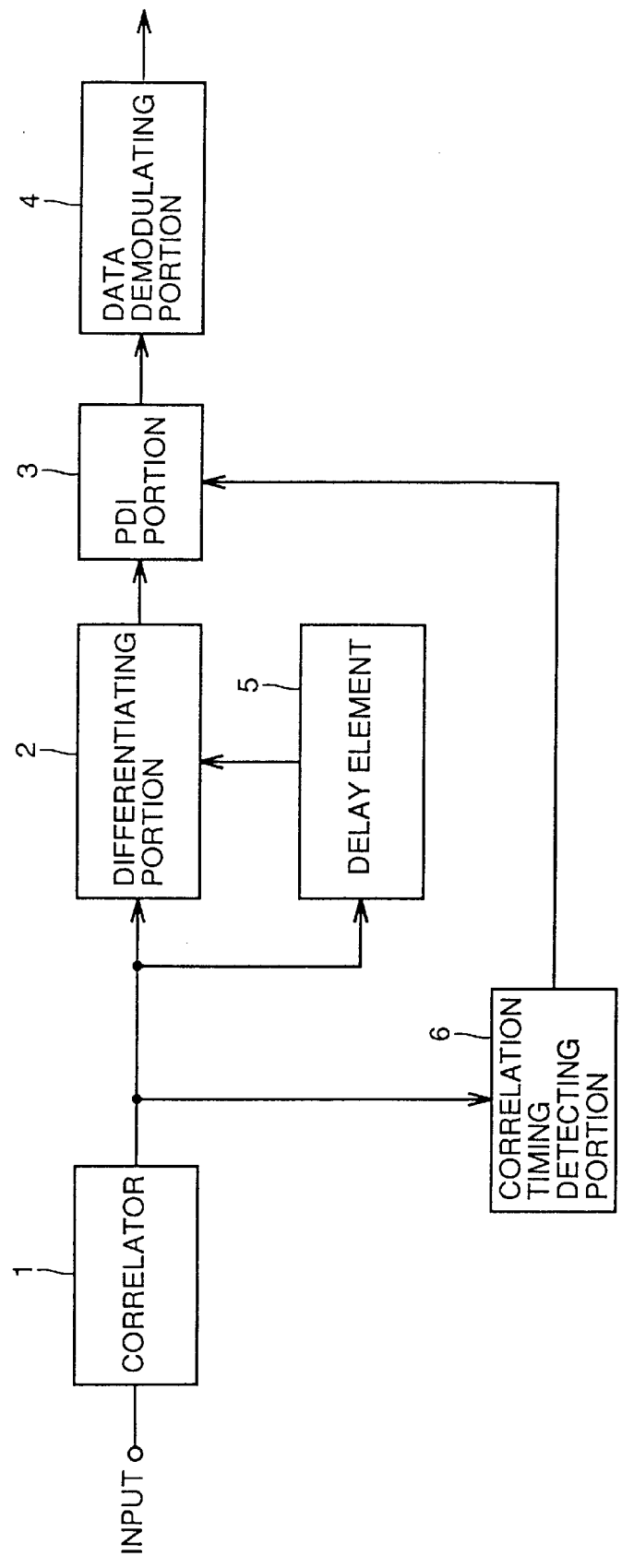
FIG. 24 is a schematic block diagram of a conventional spread spectrum communication system.
Figure 25:
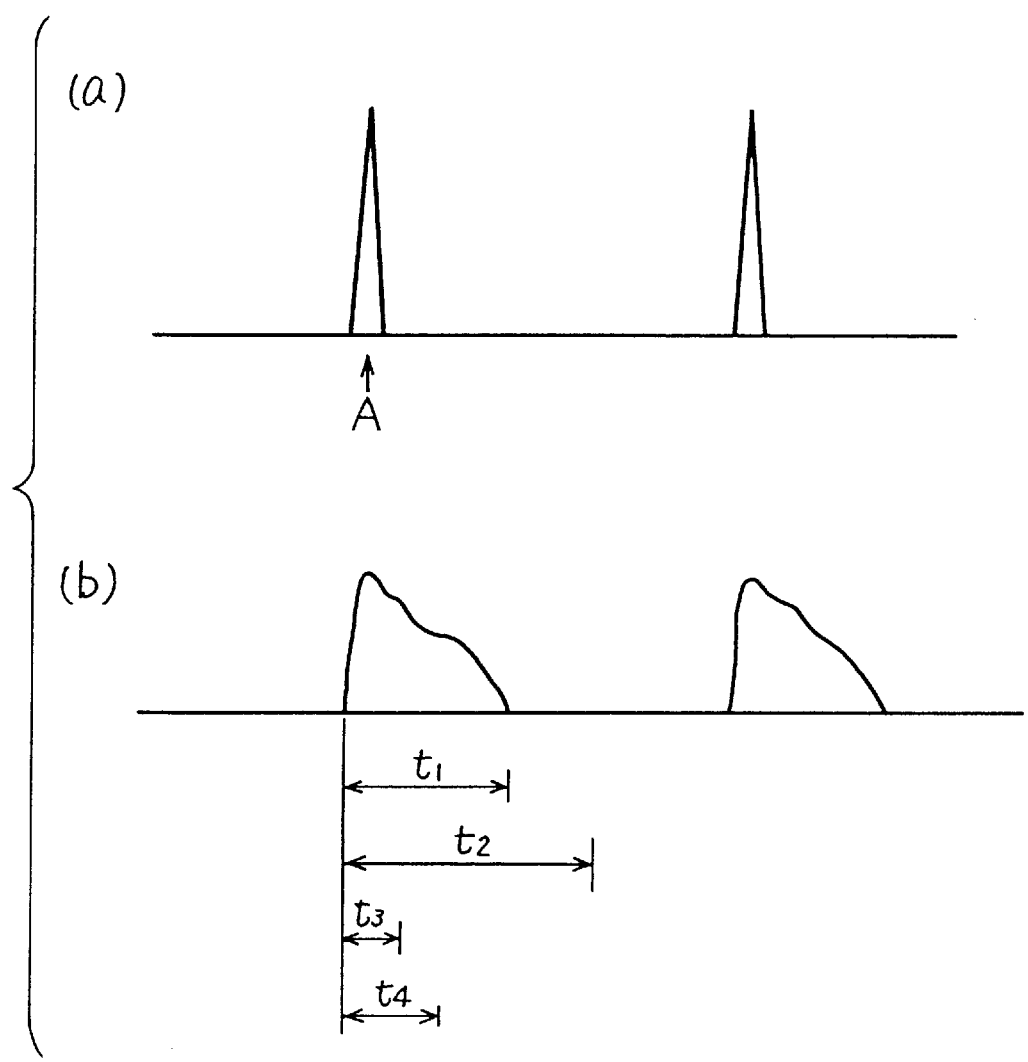
FIG. 25 shows correlated output waveforms of the system shown in FIG. 24.
Figure 26:
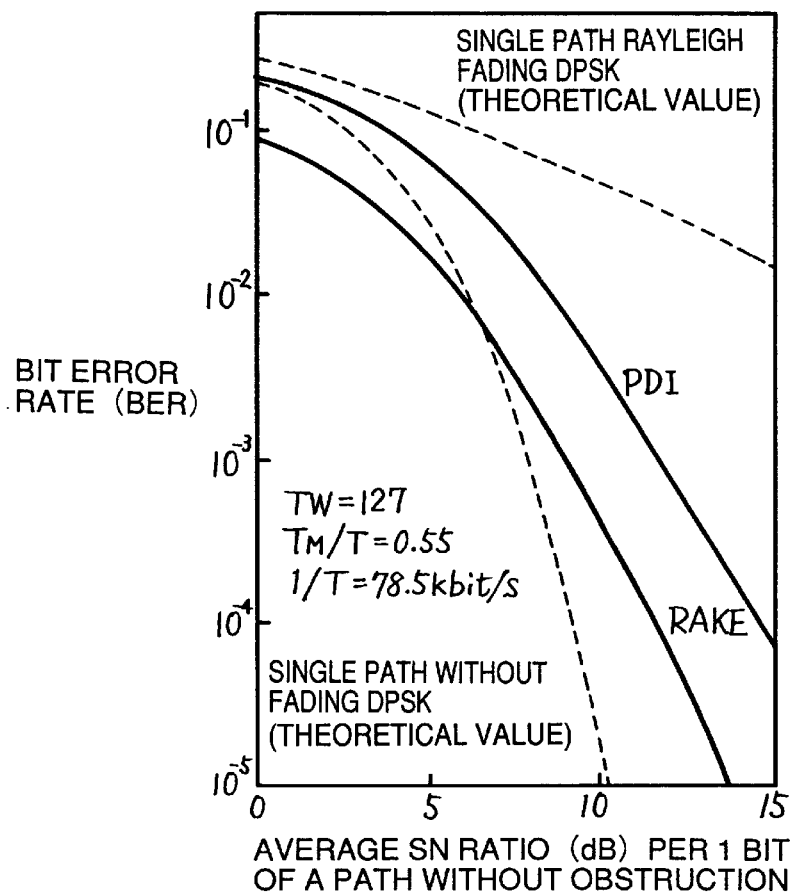
FIG. 26 shows error rate characteristic when path diversity such as PDI or RAKE is used in the system shown in FIG. 24.
Figure 27:
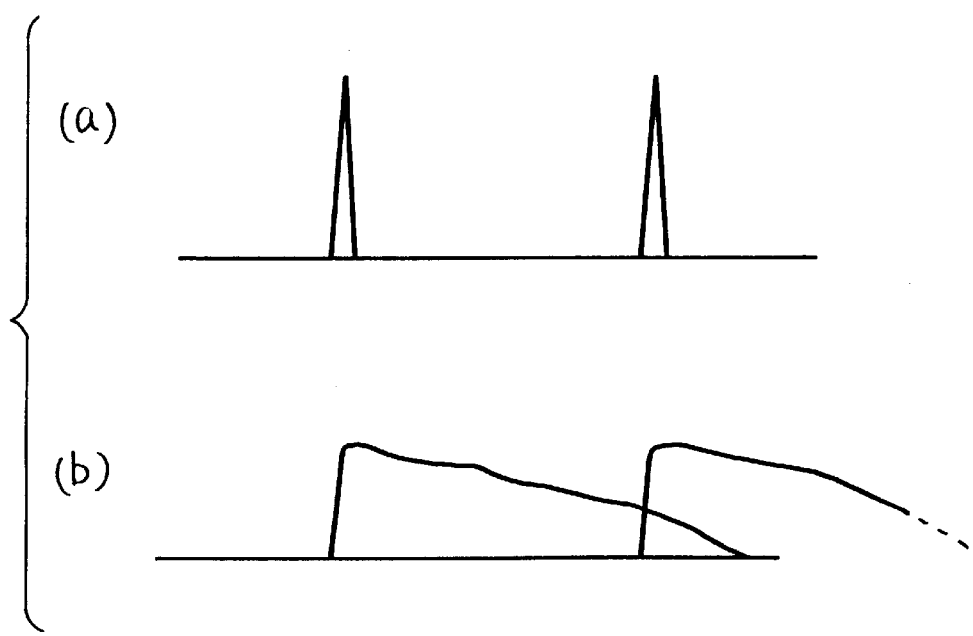
FIG. 27 shows correlated output waveforms of the conventional system.
Figure 28:
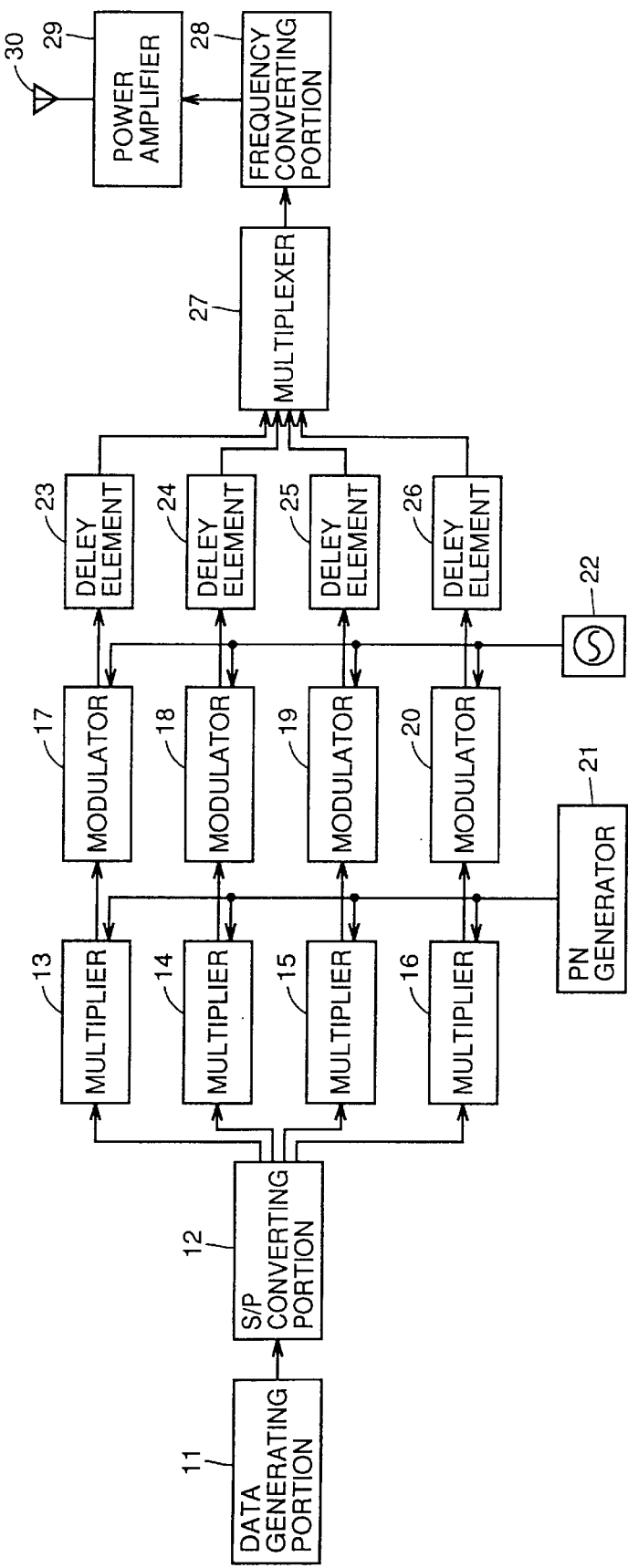
FIG. 28 is a block diagram of a system proposed by the inventors of the present application.
Figure 29:
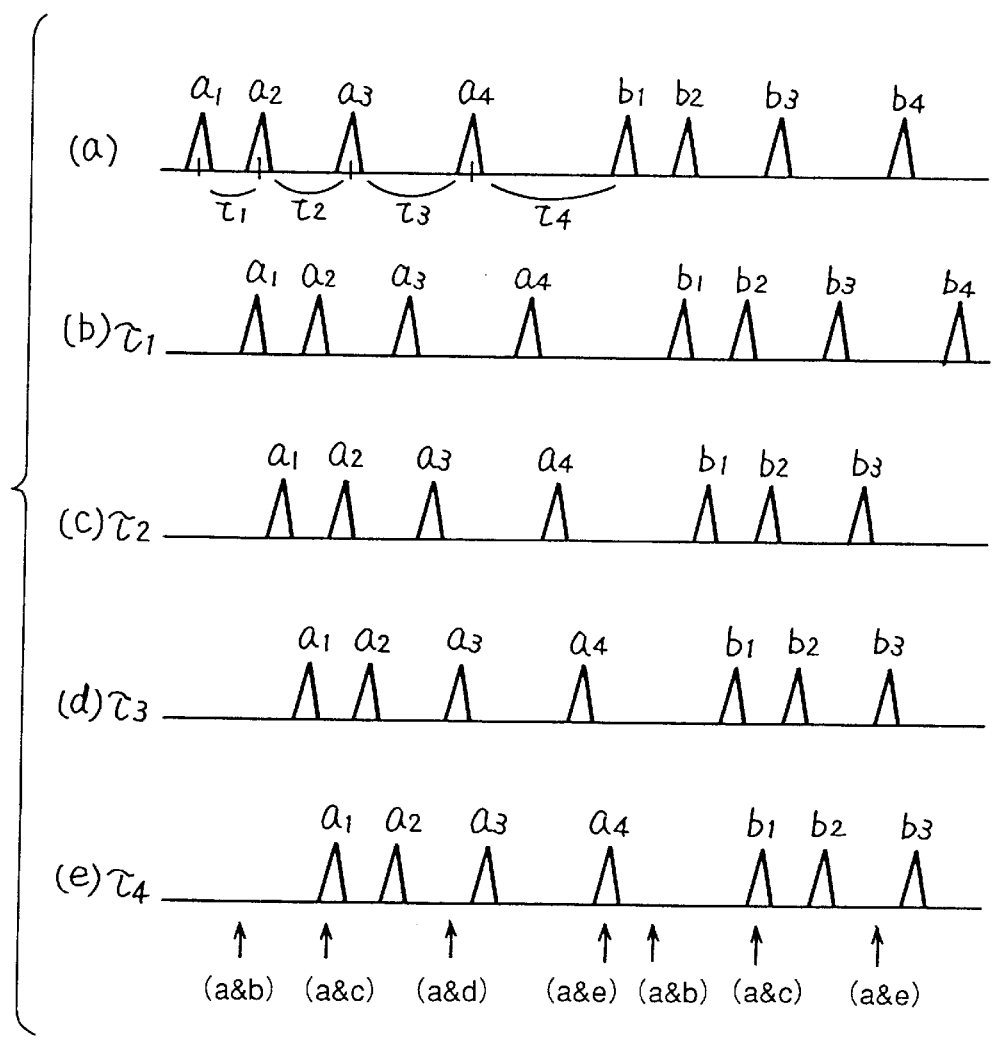
FIG. 29 shows correlated output waveforms of the system shown in FIG. 28.

FIG. 23 is a block diagram showing such an embodiment. Referring to FIG. 23, the circuit 550 for determining the number of multiplexing/amount of delay is controlled from an upper layer, and the information is transmitted involved in a multiplexing number data corresponding to one multiplexing. As a result, even to a protocol system having more elaborated layered structure, the present invention can be applied.

As described above, according to the embodiments of the present invention, a delay profile can be calculated from a known data portion in a preamble portion of a data format, for example, and setting of path diversity is determined, whereby optimal setting at that time is possible, and performance such as error rate can be improved as compared with the prior art.

Further, setting of a multipath canceler is determined based on the delay profile, and therefore the canceler can be operated effectively, degradation caused by multipath fading can be avoided and performance can be improved.

Further, when a modulator/demodulator in which data is multiplexed by providing delay and then combining, multiplexing without any waste is possible, and as a result, maximum amount of data can be transmitted, improving through put.

Further, as the delay property is calculated based on the delay profile using a theoretical formula, delicate control is possible and change in propagation path at very high speed can be addressed.

Further, the delay profile calculator compares a value stored in advance or calculated with a signal obtained by the detector, and delay profile is calculated based on the output of comparison. Therefore, influence of auto-correlation can be eliminated and only the delay portion can be calculated precisely.

Further, calculated signals are integrated at every timing of same spread period, and resulting value is used as delay profile, so that influence of gaussian noise or the like can be reduced and delay profile can be output precisely.

Further, the calculated difference signal is filtered at every same spread period and the value is used as delay profile, influence of delay signal portion such as gaussian noise can further be reduced as compared with simple integration.

Further, in the multipath canceler, not only the delay profile but also signal component of a delay amount in accordance with the timing of data demodulation can be calculated and subtracted in accordance with already demodulated data component obtained from demodulating portion, whereby only the multipath fading can be cancelled. Therefore, the circuit can be simplified as compared with a conventional multipath canceler.

Further, by providing a reference for determination as to whether subtraction should be performed or not, when the canceler does not contribute to improved performance or when canceler may cause degradation, the performance can be improved by not applying the canceler. Accordingly, the circuit can be made compact and power can be saved. Further, by storing an amount of interference corresponding to the error rate necessary for the circuit in advance for multiplexing, the number of multiplexing and the amount of delay can be optimally set and the through put can be improved.

Further, in the data format, multiplexing is not performed in the preamble portion and subsequent defined data portion, and only that portion which includes the information is multiplexed. Therefore, the number of multiplexing and the amount of delay can be determined on real time basis from this portion.

Further, the number of multiplexing and the amount of delay are transmitted incorporated as piece of information in the data portion which is not subjected to multiplexing, and therefore identification of the number of multiplexing and the amount of delay can be facilitated.

Further, two systems for bidirectional communication are provided, while determination of the number of multiplexing and the amount of delay is performed and the resulting determined number and amount are incorporated in the data portion only in one system, whereby the circuit can be simplified.

Further, the number of multiplexing and the amount of delay are selected using signals after demodulation and error detection, whereby it is possible to increase the number of multiplexing if the error rate is satisfactory and the number may be reduced when the error rate is not satisfactory. Therefore, the error rate can be improved and the number of multiplexing can be switched dependent on the error rate without the necessity to calculate the delay spread, and hence the circuit can be simplified.

Further, by detecting C/N and determining the number of multiplexing and the amount of delay in accordance with the detected C/N, it is possible to transmit with increased number of multiplexing when C/N is good and with the number of multiplexing reduced when C/N is not good. As a result, stable communication is ensured no matter whether C/N is satisfactory or not.

Further, by changing the number of multiplexing and the amount of delay in accordance with the amount of information of data to be transmitted, transmission rate in accordance with application requirement can be set.

Further, as the number of multiplexing and the amount of delay are controlled in accordance with information from upper layer, the present invention can be applied to a protocol system having layered structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance, a correlated output of the known data portion;

modulating/demodulating means for not performing multiplexing at the known data portion output from said known data portion output means and a subsequent specific data portion, and for multiplexing by delaying and combining data at a subsequent specific portion; and means for calculating a delay profile for outputting a correlated signal at an actual measurement of the known data portion based on a detection signal from said detecting means and comparing the output correlated signal and a correlated output from said known data portion output means to provide a delay profile indicating a state of a delayed signal, said modulating/demodulating means determining a number of multiplexing and an amount of delay based on the delay profile calculated by said delay profile calculating means.

2. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance, a correlated output of the known data portion;

modulating/demodulating means for not performing multiplexing at the known data portion output from said known data portion output means and a subsequent specific data portion, and for multiplexing by delaying and combining data at a subsequent specific portion; and error rate detecting means for detecting an error rate from a demodulated output of said modulating/demodulating means, said modulating/demodulating means determining a number of multiplexing and an amount of delay based on the error rate detected by said error rate detecting means.

3. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance, a correlated output of the known data portion;

modulating/demodulating means for not performing multiplexing at the known data portion output from said known data portion output means and a subsequent specific data portion, and for multiplexing by delaying and combining data at a subsequent specific portion; and carrier to noise ratio detecting means for detecting a carrier to noise ratio from an output of said correlating means, said modulating/demodulating means determining a number of multiplexing and an amount of delay based on the carrier to noise ratio detected by said carrier to noise ratio detecting means.

4. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance, a correlated output of the known data portion;

modulating/demodulating means for not performing multiplexing at the known data portion output from said known data portion output means and a subsequent specific data portion, and for multiplexing by delaying and combining data at a subsequent specific portion; and input means for inputting an amount of information of data to be transmitted, said modulating/demodulating means determining a number of multiplexing and an amount of delay based on the amount of information of data to be transmitted input from said input means.

5. A spread spectrum communication apparatus for transmission/reception using spread spectrum communication in such a data format that has a known data portion at a preamble portion, comprising:

correlating means for correlating a reception signal with a predetermined code;

detecting means for detecting the known data portion from the signal correlated by said correlating means;

known data portion output means for outputting in advance, a correlated output of the known data portion; and modulating/demodulating means for not performing multiplexing at the known data portion output from said known data portion output means and a subsequent specific data portion, and for multiplexing by delaying and combining data at a subsequent specific portion, said modulating/demodulating means determining a number of multiplexing and an amount of delay based on information from an upper layer.

* * * * *